(12) United States Patent
Bontrager et al.

(10) Patent No.: US 12,077,347 B2
(45) Date of Patent: Sep. 3, 2024

(54) CLOSURE AND DRAINAGE FOR FOOD CONTAINERS AND FOOD SUPPORTS

(71) Applicant: Congruens Group, LLC, San Carlos, CA (US)

(72) Inventors: Rick Bontrager, San Carlos, CA (US); Casper Chiang, San Carlos, CA (US); Jacob Patrick Flaherty, San Carlos, CA (US)

(73) Assignee: Congruens Group, LLC, San Carlos, CA (US)

( * ) Notice: Subject to any disclaimer, the term of this patent is extended or adjusted under 35 U.S.C. 154(b) by 0 days.

(21) Appl. No.: 17/422,538

(22) PCT Filed: Jan. 14, 2020

(86) PCT No.: PCT/US2020/013580
§ 371 (c)(1),
(2) Date: Jul. 13, 2021

(87) PCT Pub. No.: WO2020/150289
PCT Pub. Date: Jul. 23, 2020

(65) Prior Publication Data
US 2022/0097924 A1   Mar. 31, 2022

Related U.S. Application Data

(60) Provisional application No. 62/793,262, filed on Jan. 16, 2019, provisional application No. 62/803,971, filed on Feb. 11, 2019.

(51) Int. Cl.
*B65D 43/02*   (2006.01)
*B65D 1/26*    (2006.01)
(Continued)

(52) U.S. Cl.
CPC ............ *B65D 43/021* (2013.01); *B65D 1/26* (2013.01); *B65D 21/0223* (2013.01);
(Continued)

(58) Field of Classification Search
CPC .... B65D 43/021; B65D 1/26; B65D 21/0223; B65D 21/0222
See application file for complete search history.

(56) References Cited

U.S. PATENT DOCUMENTS

| 132,808 A | 11/1872 | Currier |
|---|---|---|
| 1,236,360 A | 8/1917 | Rice |

(Continued)

FOREIGN PATENT DOCUMENTS

| AU | 1977025870 | 6/1976 |
|---|---|---|
| AU | 2018211256 | 8/2018 |

(Continued)

OTHER PUBLICATIONS

International Search Report for International Application No. PCT/US2020/013580 mailed Jun. 26, 2020 (4 pages).

(Continued)

*Primary Examiner* — Jeffrey R Allen
(74) *Attorney, Agent, or Firm* — Goodwin Procter LLP

(57) ABSTRACT

Systems and methods for providing compostable food containers that preserve the quality of a food product for an extended duration of time, and which optionally allow for cooking of the food product therein. In some implementations, the food containers are sturdy, stackable, insulating, and require minimal or no manual labor to assemble. In some implementations, the food container includes a base and a cover which cooperate to form a closed chamber for supporting, protecting, insulating and optionally cooking a food product, such as a pizza. The base and cover may each be formed of a single layer of material including, but not (Continued)

limited to, molded sugarcane fiber ("bagasse"), molded wood fiber, molded bamboo fiber, molded paper or plastic.

15 Claims, 22 Drawing Sheets

(51) Int. Cl.
  *B65D 21/02* (2006.01)
  *B65D 25/24* (2006.01)
  *B65D 51/24* (2006.01)
  *B65D 81/26* (2006.01)
  *B65D 85/36* (2006.01)

(52) U.S. Cl.
  CPC .......... *B65D 25/24* (2013.01); *B65D 51/245* (2013.01); *B65D 81/261* (2013.01); *B65D 85/36* (2013.01); *B65D 2543/00027* (2013.01); *B65D 2543/00092* (2013.01); *B65D 2543/00296* (2013.01); *B65D 2543/00305* (2013.01); *B65D 2543/00351* (2013.01); *B65D 2543/00518* (2013.01); *B65D 2543/00546* (2013.01); *B65D 2543/00648* (2013.01); *B65D 2543/00685* (2013.01); *B65D 2543/00768* (2013.01); *B65D 2543/00796* (2013.01); *B65D 2543/00833* (2013.01); *B65D 2585/366* (2013.01)

(56) References Cited

U.S. PATENT DOCUMENTS

| | | |
|---|---|---|
| 1,587,288 A | 6/1926 | Dooly |
| 1,718,668 A | 6/1929 | Smythe |
| 2,301,510 A | 11/1942 | Bolen |
| 3,132,423 A | 5/1964 | De Lano |
| 3,155,303 A | 11/1964 | Fenkel |
| 3,268,198 A | 8/1966 | Swett |
| 3,392,468 A | 7/1968 | Wolf |
| D215,766 S | 10/1969 | Dusek |
| 3,664,256 A | 5/1972 | Peirce |
| D223,854 S | 6/1972 | Swett |
| 3,929,564 A | 12/1975 | Reifers |
| 3,954,178 A | 5/1976 | Mason, Jr. |
| 3,985,991 A | 10/1976 | Levinson |
| D242,108 S | 11/1976 | Dart |
| D243,912 S | 4/1977 | Daenen |
| D244,065 S | 4/1977 | Daenen |
| D245,384 S | 8/1977 | Ashton |
| 4,061,241 A | 12/1977 | Retelny |
| 4,120,398 A | 10/1978 | Braddon |
| 4,127,189 A | 11/1978 | Shumrack et al. |
| D252,008 S | 6/1979 | Jeambey |
| 4,197,940 A | 4/1980 | DeRossett |
| 4,360,118 A | 11/1982 | Stern |
| 4,373,633 A | 2/1983 | Lutz, Sr. |
| 4,373,636 A | 2/1983 | Hoffman |
| 4,498,586 A | 2/1985 | Vitale |
| 4,632,836 A | 12/1986 | Abbott et al. |
| 4,656,068 A | 4/1987 | Raines |
| 4,813,543 A | 3/1989 | Goldberg |
| 4,816,646 A | 3/1989 | Solomon et al. |
| 4,886,179 A | 12/1989 | Volk |
| D306,118 S | 2/1990 | Guerrero |
| D307,243 S | 4/1990 | Baker |
| 4,919,477 A | 4/1990 | Bingham et al. |
| 5,101,997 A | 4/1992 | Bagwell et al. |
| D333,754 S | 3/1993 | Conti |
| 5,215,775 A | 6/1993 | Hoffman, Jr. |
| 5,271,518 A | 12/1993 | Webb |
| 5,273,174 A | 12/1993 | Fisher |
| D348,219 S | 6/1994 | Goldberg |
| D350,046 S | 8/1994 | Zimmerman |
| 5,377,860 A | 1/1995 | Littlejohn et al. |
| 5,411,140 A | 5/1995 | Byer |
| 5,423,477 A | 6/1995 | Valdman et al. |
| D361,594 S | 8/1995 | Salis |
| D363,219 S | 10/1995 | Borsboom |
| 5,472,139 A * | 12/1995 | Valdman .................. B65D 1/34 229/407 |
| 5,518,133 A | 5/1996 | Hayes et al. |
| D371,511 S | 7/1996 | Giarracca |
| D373,704 S | 9/1996 | Doxey |
| D375,261 S | 11/1996 | Fiori |
| 5,732,610 A | 3/1998 | Halladay et al. |
| D393,801 S | 4/1998 | Hayes et al. |
| D394,005 S | 5/1998 | Marijnissen |
| D395,599 S | 6/1998 | Wyslotsky |
| D398,846 S | 9/1998 | Wyslotsky |
| D398,847 S | 9/1998 | Wyslotsky et al. |
| D398,848 S | 9/1998 | Wyslotsky |
| D400,394 S | 11/1998 | Banach et al. |
| 5,873,294 A | 2/1999 | Scuito |
| 5,878,904 A | 3/1999 | Schweigert |
| D415,652 S | 10/1999 | Loew |
| 5,997,924 A | 12/1999 | Olander, Jr. et al. |
| D433,334 S | 11/2000 | Hayes et al. |
| D438,466 S | 3/2001 | Fletcher et al. |
| D440,490 S | 4/2001 | Lizzio |
| 6,257,434 B1 * | 7/2001 | Lizzio .................. B65D 43/162 220/4.23 |
| D473,791 S | 4/2003 | Loris |
| 6,568,586 B1 | 5/2003 | Van Esley et al. |
| 6,601,758 B2 | 8/2003 | Lizzio |
| 6,627,862 B1 | 9/2003 | Pedersen |
| D482,283 S | 11/2003 | Wichmann et al. |
| D484,412 S | 12/2003 | Willis |
| D484,749 S | 1/2004 | Garraway |
| D502,050 S | 2/2005 | Munson et al. |
| 6,858,243 B2 | 2/2005 | Blanchet et al. |
| 6,886,704 B2 | 5/2005 | Hayes |
| 6,902,057 B2 | 6/2005 | Duffy |
| D507,078 S | 7/2005 | Greenfiled |
| 6,957,111 B2 | 10/2005 | Zhu et al. |
| D511,096 S | 11/2005 | Demaggio |
| D524,662 S | 7/2006 | Fager |
| D532,689 S | 11/2006 | Rotta |
| D535,143 S | 1/2007 | Kortleven |
| D546,128 S | 7/2007 | Carlson |
| D547,602 S | 7/2007 | Yamasaki |
| D549,050 S | 8/2007 | Spencer et al. |
| D553,819 S | 10/2007 | Brothers |
| D556,567 S | 12/2007 | Templeton |
| D562,135 S | 2/2008 | Studee |
| D563,785 S | 3/2008 | Maki et al. |
| D573,466 S | 7/2008 | White et al. |
| D575,112 S | 8/2008 | Since |
| 7,505,929 B2 | 3/2009 | Angert et al. |
| D598,714 S | 8/2009 | Aagaard |
| 7,678,036 B1 | 3/2010 | Malitas et al. |
| D618,562 S | 6/2010 | Bizzell |
| D620,765 S | 8/2010 | Sudia |
| D620,766 S | 8/2010 | Sudia |
| D621,650 S | 8/2010 | DeLeo |
| 7,778,773 B2 | 8/2010 | Yaqub et al. |
| D623,061 S | 9/2010 | Wong |
| D632,957 S | 2/2011 | Kirsch |
| 7,884,306 B2 | 2/2011 | Leach |
| 7,900,793 B2 | 3/2011 | Hanson et al. |
| 7,942,268 B2 | 5/2011 | Manca |
| D641,233 S | 7/2011 | Pugh |
| 7,984,667 B2 | 7/2011 | Freudinger |
| D644,118 S | 8/2011 | Giles |
| D645,711 S | 9/2011 | Sudia |
| D653,906 S | 2/2012 | Bull |
| D653,907 S | 2/2012 | Backaert et al. |
| 8,343,560 B2 | 1/2013 | Blythe et al. |
| 8,430,262 B2 | 4/2013 | Corbett et al. |
| 8,439,215 B2 | 5/2013 | Gartz et al. |
| D684,046 S | 6/2013 | Meyer |
| D684,462 S | 6/2013 | Hite |
| 8,549,432 B2 | 10/2013 | Warner |
| 8,561,823 B1 | 10/2013 | Krupa |

(56) References Cited

U.S. PATENT DOCUMENTS

| | | |
|---|---|---|
| D696,066 S | 12/2013 | Parikh |
| D699,106 S | 2/2014 | Glaser |
| D701,567 S | 3/2014 | Abdullah |
| 8,663,419 B2 | 3/2014 | Corbett et al. |
| 8,807,377 B2 | 8/2014 | Corbett et al. |
| D714,101 S | 9/2014 | Gartz et al. |
| 8,858,858 B2 | 10/2014 | Middleton et al. |
| D720,227 S | 12/2014 | Corbett et al. |
| D722,814 S | 2/2015 | Heiberg |
| 8,991,635 B2 | 3/2015 | Myerscough |
| 9,005,348 B2 | 4/2015 | Ott |
| 9,010,621 B2 | 4/2015 | Baker et al. |
| 9,073,666 B2 | 7/2015 | Petlak et al. |
| 9,114,916 B2 | 8/2015 | Knipe |
| 9,126,717 B2 | 9/2015 | Myerscough |
| 9,126,719 B2 | 9/2015 | Corbett et al. |
| D747,221 S | 1/2016 | Changpan |
| D748,329 S | 1/2016 | Bagai et al. |
| D749,906 S | 2/2016 | Lee |
| 9,292,889 B2 | 3/2016 | Garden |
| D761,103 S | 7/2016 | Lebon |
| 9,387,786 B2 | 7/2016 | Weiner et al. |
| 9,446,889 B2 | 9/2016 | Lopes et al. |
| D769,051 S | 10/2016 | Lee |
| D769,057 S | 10/2016 | Lee |
| D769,058 S | 10/2016 | Lee |
| 9,504,340 B2 | 11/2016 | Starr |
| D774,900 S | 12/2016 | Longoni et al. |
| 9,522,761 B2 | 12/2016 | Baker et al. |
| D775,500 S | 1/2017 | Hogeback |
| 9,538,882 B2 | 1/2017 | Parr |
| D795,069 S | 8/2017 | Haddad |
| D795,070 S | 8/2017 | Haddad |
| 9,730,555 B1 | 8/2017 | Lee |
| D801,176 S | 10/2017 | Lynd et al. |
| 9,815,191 B2 | 11/2017 | Oleynik |
| D804,322 S | 12/2017 | Fox et al. |
| D804,962 S | 12/2017 | Fox et al. |
| D806,575 S | 1/2018 | Collins et al. |
| D811,214 S | 2/2018 | Wu |
| D827,452 S | 9/2018 | Collins et al. |
| D828,161 S | 9/2018 | Collins et al. |
| D829,512 S | 10/2018 | Masanek, Jr. |
| D833,204 S | 11/2018 | Lee |
| 10,213,048 B2 | 2/2019 | Lee |
| D843,207 S | 3/2019 | Das et al. |
| D859,936 S | 9/2019 | Buck |
| D861,422 S | 10/2019 | Collins |
| D866,249 S | 11/2019 | Chiang |
| D872,599 S | 1/2020 | Krueger |
| D884,486 S | 5/2020 | Chiang |
| 10,654,640 B2 | 5/2020 | Chiang |
| D918,712 S | 5/2021 | Bontrager |
| 2002/0037378 A1 | 3/2002 | Littlejohn |
| 2002/0040862 A1 | 4/2002 | Lizzio |
| 2002/0048624 A1 | 4/2002 | Blanchet et al. |
| 2002/0148845 A1 | 10/2002 | Zettle et al. |
| 2003/0037681 A1 | 2/2003 | Zhu et al. |
| 2005/0109653 A1 | 5/2005 | Wnek et al. |
| 2005/0189350 A1 | 9/2005 | Hayes et al. |
| 2005/0193901 A1 | 9/2005 | Buehler |
| 2006/0175223 A1 | 8/2006 | Casanovas |
| 2006/0213916 A1 | 9/2006 | Brown et al. |
| 2006/0226669 A1 | 10/2006 | Tong et al. |
| 2007/0241110 A1 | 10/2007 | Belleggia |
| 2007/0295631 A1 | 12/2007 | Lin |
| 2008/0023459 A1 | 1/2008 | Leach |
| 2008/0128313 A1 | 6/2008 | Anderson |
| 2008/0275643 A1 | 11/2008 | Yaqub et al. |
| 2009/0048890 A1 | 2/2009 | Burgh |
| 2009/0057381 A1 | 3/2009 | Gokhale |
| 2010/0065562 A1 | 3/2010 | Vovan |
| 2010/0122930 A1 | 5/2010 | Manca |
| 2010/0170899 A1 | 7/2010 | Mithal et al. |
| 2010/0200591 A1 | 8/2010 | Myerscough |
| 2011/0036846 A1 | 2/2011 | Corbett et al. |
| 2011/0086141 A1 | 4/2011 | Strilich et al. |
| 2011/0220652 A1 | 9/2011 | Corbett et al. |
| 2012/0006842 A1 | 1/2012 | Overgaag |
| 2012/0024859 A1* | 2/2012 | Longoni ............ B65D 51/1611 220/367.1 |
| 2012/0024897 A1 | 2/2012 | Corbett et al. |
| 2012/0031901 A1 | 2/2012 | Dudson et al. |
| 2012/0175367 A1 | 7/2012 | Lopes et al. |
| 2012/0234717 A1 | 9/2012 | Kirkland |
| 2012/0298673 A1* | 11/2012 | Chen .................. B65D 1/36 220/500 |
| 2013/0313257 A1 | 11/2013 | Gartz et al. |
| 2014/0370167 A1 | 12/2014 | Garden |
| 2015/0068945 A1 | 3/2015 | Baker et al. |
| 2015/0068946 A1 | 3/2015 | Baker et al. |
| 2015/0109653 A1 | 4/2015 | Greer et al. |
| 2015/0290795 A1 | 10/2015 | Oleynik |
| 2015/0343933 A1 | 12/2015 | Weiner et al. |
| 2016/0162833 A1 | 6/2016 | Garden |
| 2016/0214778 A1 | 7/2016 | Goodsell et al. |
| 2017/0275077 A1 | 9/2017 | Chiang et al. |
| 2018/0022523 A1 | 1/2018 | Noferi |
| 2018/0029764 A1 | 2/2018 | Chung et al. |
| 2018/0071939 A1 | 3/2018 | Garden et al. |
| 2018/0105344 A1 | 4/2018 | Chiang |
| 2018/0121037 A1 | 5/2018 | Wajda et al. |
| 2018/0215523 A1 | 8/2018 | Chiang |
| 2019/0009968 A1 | 1/2019 | Chiang et al. |
| 2019/0218711 A1 | 7/2019 | Chung et al. |
| 2019/0300263 A1 | 10/2019 | Chiang |
| 2019/0315564 A1 | 10/2019 | Chung et al. |
| 2020/0024806 A1 | 1/2020 | Chung et al. |

FOREIGN PATENT DOCUMENTS

| | | |
|---|---|---|
| CN | 301396948 S | 12/2010 |
| CN | 108216841 A | 6/2018 |
| EP | 0989067 | 3/2000 |
| EP | 1500593 A3 | 4/2005 |
| EP | 1043247 B1 | 6/2006 |
| EP | 2230184 | 9/2010 |
| EP | 2243723 | 10/2010 |
| EP | 3006370 | 7/2018 |
| JP | 07-002285 U | 1/1995 |
| JP | 2002-347944 | 12/2002 |
| JP | 5244344 | 7/2013 |
| KR | 20-0360448 | 8/2004 |
| KR | 10-2009-0098949 | 9/2009 |
| KR | 10-2015-0121771 | 10/2015 |
| KR | 30-0990068 | 1/2019 |
| TW | M338217 U | 8/2008 |
| TW | 201739668 A | 11/2017 |
| WO | WO-9412397 A1 | 6/1994 |
| WO | 2012/005683 | 1/2012 |
| WO | 2015/006649 | 1/2015 |

OTHER PUBLICATIONS

PCT International Preliminary Report on Patentability in International Application PCT/US2020/013580, mailed Jul. 29, 2021, 12 pages.

Casper W. Chang et al., "Container for Transport and Storage of Food Products," U.S. Appl. No. 62/311,787, filed Mar. 22, 2016, 50 pages.

Core77 "Notable Packaging Award: Core77 Design Awards 2017, Zume Pizza 'Pizza Pod'" May 14, 2017, https://web.archive.org/web/20170614144555/http://designawards.core77.com/Packaging/62804/Zume-Pizza-Pod, downloaded on Mar. 26, 2018, 4 pages.

Divya, "Sealed Air and Kuraray to Invest in Capacity at Simpsonville Facility to Produce Plant-Based Food Packaging", Mar. 22, 2019, located online on May 8, 2019 at: https://packaging360.in/news/sealed-air-invests-in-to-simpsonville-facility-to-produce-pla . . . , 7 pages.

DuPont, "Compostable "Pizza Pod" (Zume Pizza, USA)—Diamond Finalist Award," May 22, 2017, downloaded from http://www.

(56) References Cited

OTHER PUBLICATIONS dupont.com/industries/packaging-and-printing/media/press-kits/2017-packaging-awards/mc-image-detail/compostable-pizza-pod.html on Apr. 20, 2018, 1 page.
Entis et al., "This Robot-Made Pizza Is Baked in the Van on the Way to Your Door," Sep. 29, 2016, downloaded from http://fortune.com/2016/09/29/this-robot-made-pizza-is-baked-in-the-van-on-the-way-to-your-front-door/ on Apr. 20, 2018, 1 page.
European Search Report in Application 17770987.0, mailed Feb. 12, 2019, 8 pages.
Farkya, "Compostable Pizza Pod," Nov. 14, 2016, downloaded from http://www.packagingconnections.com/news/compostable-pizzapod.htm on Apr. 20, 2018, 7 pages.
Garden, "Systems and Methods of Preparing Food Products," Notice of Allowance, mailed Jan. 7, 2016, for U.S. Appl. No. 13/920,998, 9 pages.
Garden, "Systems and Methods of Preparing Food Products," U.S. Appl. No. 15/040,866, filed Feb. 10, 2016, 71 pages.
Garden, "Systems and Methods of Preparing Food Products," Advisory Action, mailed Aug. 27, 2015, for U.S. Appl. No. 13/920,998, 3 pages.
Garden, "Systems and Methods of Preparing Food Products," Advisory Action, mailed Jul. 29, 2015, for U.S. Appl. No. 13/920,998, 3 pages.
Garden, "Systems and Methods of Preparing Food Products," Amendment, filed Apr. 2, 2015, for U.S. Appl. No. 13/920,998, 23 pages.
Garden, "Systems and Methods of Preparing Food Products," Amendment, filed Aug. 10, 2015, for U.S. Appl. No. 13/920,998, 29 pages.
Garden, "Systems and Methods of Preparing Food Products," Amendment, filed Jul. 22, 2015, for U.S. Appl. No. 13/920,998, 29 pages.
Garden, "Systems and Methods of Preparing Food Products," Amendment, filed Sep. 25, 2015, for U.S. Appl. No. 13/920,998, 29 pages.
Garden, "Systems and Methods of Preparing Food Products," Office Action, mailed Mar. 16, 2015, for U.S. Appl. No. 13/920,998, 28 pages.
Garden, "Systems and Methods of Preparing Food Products," Office Action, mailed May 27, 2015, for U.S. Appl. No. 13/920,998, 31 pages.
Gardner, "Systems and Methods of Preparing Food Products," Response to Restriction Requirement, filed Oct. 24, 2014, for U.S. Appl. No. 13/920,998, 3 pages.
Gardner, "Systems and Methods of Preparing Food Products," Restriction Requirement, mailed Sep. 10, 2014, for U.S. Appl. No. 13/920,998, 5 pages.
Kelley, Mary K., "Caffeine Fix: The Design of Coffee Cup Lids", from Mary Kate's Experience with Human Factors, found online at: https://sites.tufts.edu/mkelleyhfintro/2018/04/12/caffeine-fix-the-design-of-coffee-cup-lids/, Apr. 12, 2018, 8 pages.
Molina, "Yes, Apple really did patent its own pizza box," May 17, 2017, downloaded from https://www.usatoday.com/story/tech/talkingtech/2017/05/17/apple-patented-its-own-pizza-box/327267001/ on Apr. 20, 2018, 2 pages.
Notice of Allowance dated Feb. 13, 2019, issued in U.S. Appl. No. 29/558,874, 10 pages.
Notice of Allowance, dated Jul. 24, 2018, for U.S. Appl. No. 29/618,670, Collins et al., "Food Container," 2 pages.
Notice of Allowance, dated Jun. 6, 2018, for U.S. Appl. No. 29/618,670, Collins et al., "Food Container," 2 pages.
Notice of Allowance, dated May 31, 2018, for U.S. Appl. No. 29/574,805, Collins et al., "Food Container Cover," 2 pages.
Notice of Allowance, mailed Apr. 25, 2018, for U.S. Appl. No. 29/618,670, Collins et al., "Food Container" 7 pages.
Notice of Allowance, mailed May 9, 2018, for U.S. Appl. No. 29/574,805, Collins et al., "Food Container and Cover", 10 pages.
Office Action dated Aug. 28, 2018 issued in U.S. Appl. No. 15/845,916, 24 pages.
Office Action dated Aug. 30, 2018 issued in U.S. Appl. No. 15/936,069, 14 pages.
Office Action dated Dec. 20, 2018 issued in U.S. Appl. No. 15/465,228, 27 pages.
PCT International Preliminary Report on Patentability in Application PCT/US2018/040749, mailed Jan. 16, 2020, 20 pages.
PCT International Preliminary Report on Patentability in Application PCT/US2020/013569, mailed Jul. 29, 2021, 13 pages.
PCT International Search Report and Written Opinion in International Application PCT/US2018/040730, mailed Nov. 14, 2018, 22 pages.
PCT International Search Report and Written Opinion in International Application PCT/US2020/013569, mailed Jun. 26, 2020, 21 pages.
PCT International Search Report and Written Opinion in International Application PCT/US2020/013580, mailed Jun. 26, 2020, 20 pages.
PCT International Search Report and Written Opinion of the International Searching Authority, mailed Jun. 26, 2017, for International Application No. PCT/US2017/023408, 17 pages.
PCT International Search Report, mailed Oct. 22, 2014, for International Application No. PCT/US2014/042879, 3 pages.
PCT Search Report and Written Opinion dated Nov. 16, 2018 issued in International Patent Application No. PCT/US2018/040749, 24 pages.
PCT Written Opinion of the International Searching Authority, mailed Oct. 22, 2014, for International Application No. PCT/US2014/042879, 8 pages.
PW Staff, "Humanitarian initiative wins top DuPont Award," Jul. 5, 2017, downloaded from https://www.packworld.com/article/trendsand-issues/global/humanitarian-initiative-wins-top-dupont-award on Apr. 20, 2018, 12 pages.
Robinson, "This robot-made pizza in Silicon Valley should terrify Domino's and Pizza Hut," Sep. 29, 2016, downloaded from https://sg.financeyahoo.com/news/robot-made-pizza-silicon-valley-16400825.htrnl?guccounter=1 on Apr. 20, 2018, 12 pages.
U.S. Appl. No. 15/465,228, Amendment and Response filed Apr. 18, 2019, 16 pages.
U.S. Appl. No. 15/465,228, Office Action mailed Feb. 26, 2020, 27 pages.
U.S. Appl. No. 15/465,228, Office Action mailed Jul. 18, 2019, 26 pages.
U.S. Appl. No. 15/845,916, Amendment and Response filed Dec. 28, 2018, 17 pages.
U.S. Appl. No. 15/845,916, Office Action mailed Apr. 13, 2020, 22 pages.
U.S. Appl. No. 15/845,916, Office Action mailed Apr. 8, 2019, 25 pages.
U.S. Appl. No. 15/845,916, Office Action mailed Aug. 14, 2019, 23 pages.
U.S. Appl. No. 15/936,069, Amendment and Response filed Nov. 28, 2018, 14 pages.
U.S. Appl. No. 15/936,069, Notice of Allowance mailed Mar. 4, 2020, 5 pages.
U.S. Appl. No. 15/936,069, Notice of Allowance mailed May 7, 2020, 2 pages.
U.S. Appl. No. 15/936,069, Office Action mailed Mar. 14, 2019, 17 pages.
U.S. Appl. No. 15/936,069, Office Action mailed Aug. 14, 2019, 16 pages.
U.S. Appl. No. 16/029,047, Notice of Allowance mailed Jan. 13, 2020, 7 pages.
U.S. Appl. No. 16/029,047, Notice of Allowance mailed Mar. 11, 2020, 2 pages.
U.S. Appl. No. 16/029,047, Notice of Allowance mailed Apr. 3, 2020, 2 pages.
U.S. Appl. No. 16/029,047, Office Action mailed Aug. 7, 2019, 6 pages.
U.S. Appl. No. 29/558,872, Amendment and Response filed Feb. 1, 2019, 23 pages.
U.S. Appl. No. 29/558,872, Ex-Parte Quayle Action mailed Nov. 18, 2019, 10 pages.

(56) References Cited

OTHER PUBLICATIONS

U.S. Appl. No. 29/558,872, Notice of Allowance mailed Mar. 27, 2020, 7 pages.
U.S. Appl. No. 29/558,872, Notice of Allowance mailed May 10, 2019, 9 pages.
U.S. Appl. No. 29/558,872, Notice of Allowance mailed Jun. 26, 2019, 14 pages.
U.S. Appl. No. 29/558,872, Office Action mailed Nov. 1, 2018, 15 pages.
U.S. Appl. No. 29/558,872, Response to Restriction Requirement filed Aug. 16, 2018, 7 pages.
U.S. Appl. No. 29/558,872, Restriction Requirement mailed May 17, 2018, 12 pages.
U.S. Appl. No. 29/558,873, Ex Parte Quayle Action mailed Sep. 6, 2018, 9 pages.
U.S. Appl. No. 29/558,873, Notice of Allowance mailed Feb. 8, 2019, 9 pages.
U.S. Appl. No. 29/558,873, Notice of Allowance mailed Jun. 26, 2019, 11 pages.
U.S. Appl. No. 29/558,873, Response filed Nov. 6, 2018, 18 pages.
U.S. Appl. No. 29/558,873, Response to Restriction Requirement filed Jul. 17, 2018, 16 pages.
U.S. Appl. No. 29/558,873, Restriction Requirement mailed May 17, 2018, 9 pages.
U.S. Appl. No. 29/558,874, Ex Parte Quayle Action mailed Feb. 27, 2020, 11 pages.
U.S. Appl. No. 29/558,874, Ex Parte Quayle Action mailed Sep. 6, 2018, 10 pages.
U.S. Appl. No. 29/558,874, Notice of Allowance mailed Feb. 13, 2019, 10 pages.
U.S. Appl. No. 29/558,874, Notice of Allowance mailed Jun. 2, 2020, 7 pages.
U.S. Appl. No. 29/558,874, Restriction Requirement mailed Apr. 27, 2018, 10 pages.
U.S. Appl. No. 29/574,802, Amendment and Response filed Aug. 3, 2017, 7 pages.
U.S. Appl. No. 29/574,802, Notice of Allowance mailed Aug. 25, 2017, 5 pages.
U.S. Appl. No. 29/574,802, Office Action mailed Jun. 1, 2017, 9 pages.
U.S. Appl. No. 29/574,805, Notice of Allowance mailed Jul. 23, 2018, 2 pages.
U.S. Appl. No. 29/574,808, Amendment and Response filed Dec. 21, 2018, 15 pages.
U.S. Appl. No. 29/574,808, Notice of Allowance mailed May 13, 2019, 5 pages.
U.S. Appl. No. 29/574,808, Notice of Allowance mailed Jun. 10, 2019, 10 pages.
U.S. Appl. No. 29/574,808, Office Action mailed Sep. 21, 2018, 11 pages.
U.S. Appl. No. 29/574,808, Response to Restriction Requirement filed Aug. 1, 2018, 1 page.
U.S. Appl. No. 29/574,808, Restriction Requirement mailed Jun. 1, 2018, 9 pages.
U.S. Appl. No. 29/656,406, Notice of Allowance mailed Jan. 23, 2020, 10 pages.
U.S. Appl. No. 29/656,406, Notice of Allowance mailed Mar. 25, 2020, 2 pages.
U.S. Appl. No. 29/656,406, Notice of Allowance mailed Jun. 20, 2019, 12 pages.
U.S. Appl. No. 29/656,406, Notice of Allowance mailed Aug. 6, 2019, 2 pages.
U.S. Appl. No. 29/679,891, Notice of Allowance mailed Jan. 12, 2021, 5 pages.
U.S. Appl. No. 29/679,891, Office Action mailed Sep. 30, 2020, 11 pages.
U.S. Appl. No. 29/698,689, Notice of Allowance mailed Apr. 6, 2020, 5 pages.
U.S. Appl. No. 29/698,689, Office Action mailed Oct. 24, 2019, 12 pages.
U.S. Appl. No. 29/700,713, Notice of Allowance mailed Apr. 8, 2020, 8 pages.
Wiener, "Food Movers: The Secret Evolution of the Pizza Box," Feb. 2016, downloaded from https://www.foodandcity.org/evolution-pizza-box/ on Apr. 20, 2018, 14 pages.
World Centric website, "New PizzaRound from World Centric: The Pizza Box Comes Full Circle", Petaluma, CA, USA, published Mar. 15, 2018, 2 pages, located online on May 2, 2019 at: http://www.worldcentric.org/node/442.
Zume Pizza Homepage: Announced 2015 [Online]. Site Visited [Apr. 20, 2018]. Available from Internet URL: https://zumepizza.com/, 7 pages.

\* cited by examiner

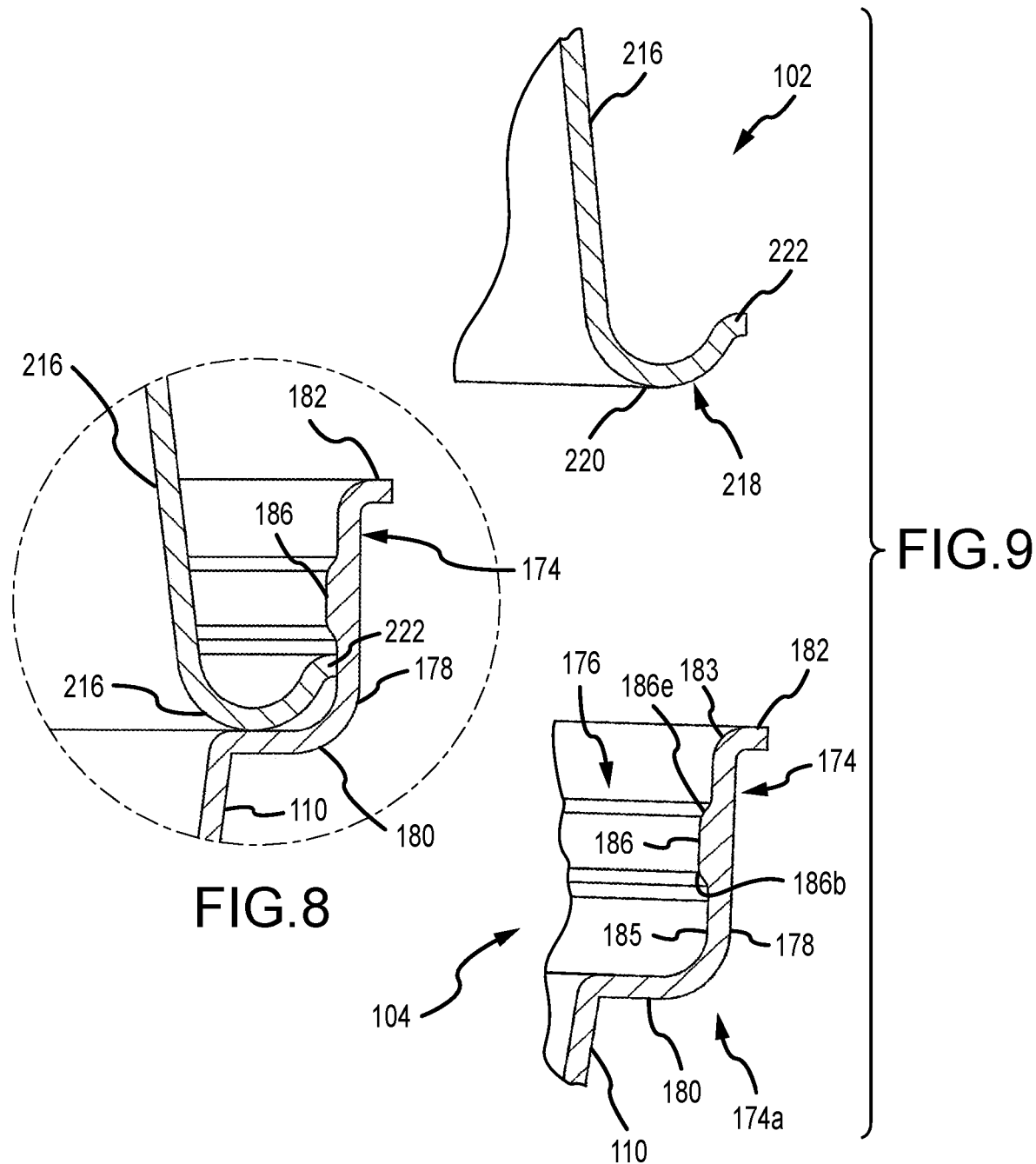

CLOSURE AND DRAINAGE FOR FOOD CONTAINERS AND FOOD SUPPORTS

CROSS-REFERENCE TO RELATED APPLICATIONS

This application is a National Stage of PCT International patent application No. PCT/2020/013580, filed 14 Jan. 2020, which claims the benefit of U.S. Provisional Patent Application No. 62/803,971 filed on Feb. 11, 2019, entitled "Closure and Drainage for Food Containers and Food Supports," and U.S. Provisional Patent Application No. 62/793,262 filed on Jan. 16, 2019, entitled "Closure for Molded Fiber Packaging," the disclosures of which are hereby incorporated by reference herein in their entireties. To the extent appropriate, a claim of priority is made to each of the above disclosed applications.

BACKGROUND

Today, the standard pizza box is a square box that is made from a single folded blank of corrugated cardboard. Once folded, the cardboard forms a box that is normally about two inches high and having equal sides of between 12 inches and 18 inches. The corrugated cardboard used to produce the pizza box is typically thick, which provides the pizza box with structural strength needed to stack multiple filled pizza boxes atop one another without the bottom box collapsing. Even then, stacking two or more pizza boxes together typically requires the ubiquitous pedestals or "pizza savers" which are placed within the box at the approximate center thereof to prevent the top or lid of the pizza box from being forced into contact with the pizza inside the box due to forces of one or more pizza boxes stacked on top of the pizza box. An example of such pizza saver is shown in U.S. Pat. No. 4,498,586.

In a traditional pizza box, the inside bottom surface of the pizza box is flat and smooth. When a pizza is placed inside the box, the bottom of the pizza rests flush against the flat bottom of the box. Consequently, any condensation, grease, or other liquid that collects between the bottom of the pizza and the bottom of the box becomes trapped. This can cause the bottom of a pizza to become soggy or oily, and can also reduce the structural integrity of the pizza box. Additionally, the top of the pizza box absorbs moisture emanating from hot, steaming pizza, which causes the top portion to droop, and which may cause the pizza box to collapse or may at least cause the top portion of the pizza box to touch the top of the pizza in instances where the aforementioned "pizza saver" is not used.

SUMMARY

In one aspect, the technology relates to a food container including: a base including: a food-receiving portion having a planar surface that is upwardly facing and has a perimeter; and a sidewall extending upwardly from the base, around the perimeter; and a cover including: at least one wall sized and shaped to provide an interior chamber with the base when the cover is engaged with the base, closing the container, the at least one wall having a periphery; wherein the sidewall of the base defines a first engaging wall and the at least one wall of the cover define a second engaging wall, and the first engaging wall and the second engaging wall are configured to be selectively engaged to secure the cover to the base.

In another aspect, the technology relates to a food support apparatus including: a base including: a food-receiving portion having a planar surface that is upwardly facing and has a perimeter; a central well extending into the planar surface; radial grooves extending into the planar surface, the radial grooves extending from the perimeter of the food receiving portion to the central well; and an elongated well between at least two adjacent radial grooves.

In another aspect, the technology relates to a food support apparatus including: a base including: a food-receiving portion having a planar surface that is upwardly facing; and a plurality of protrusions extending upward from the planar surface.

In another aspect, the technology relates to a food container including: a base including: a food-receiving portion having a planar surface that is upwardly facing and has a perimeter; and a sidewall extending upwardly from the base, around the perimeter; and a cover having: at least one wall sized and shaped to form an interior chamber with the base when the cover is engaged with the base, closing the container, the at least one wall having a periphery; wherein the cover is configured to be attached to the base; the cover further comprising a tab extending outward from a portion of one of the at least one walls, the tab being configured to fold upward when the cover is attached to the base.

BRIEF DESCRIPTION OF THE DRAWINGS

FIGS. 8 and 9 depicts enlarged section views of a fastening rim, assembled and exploded, respectively, of the food container of FIG. 1.

DETAILED DESCRIPTION

Figure 1:
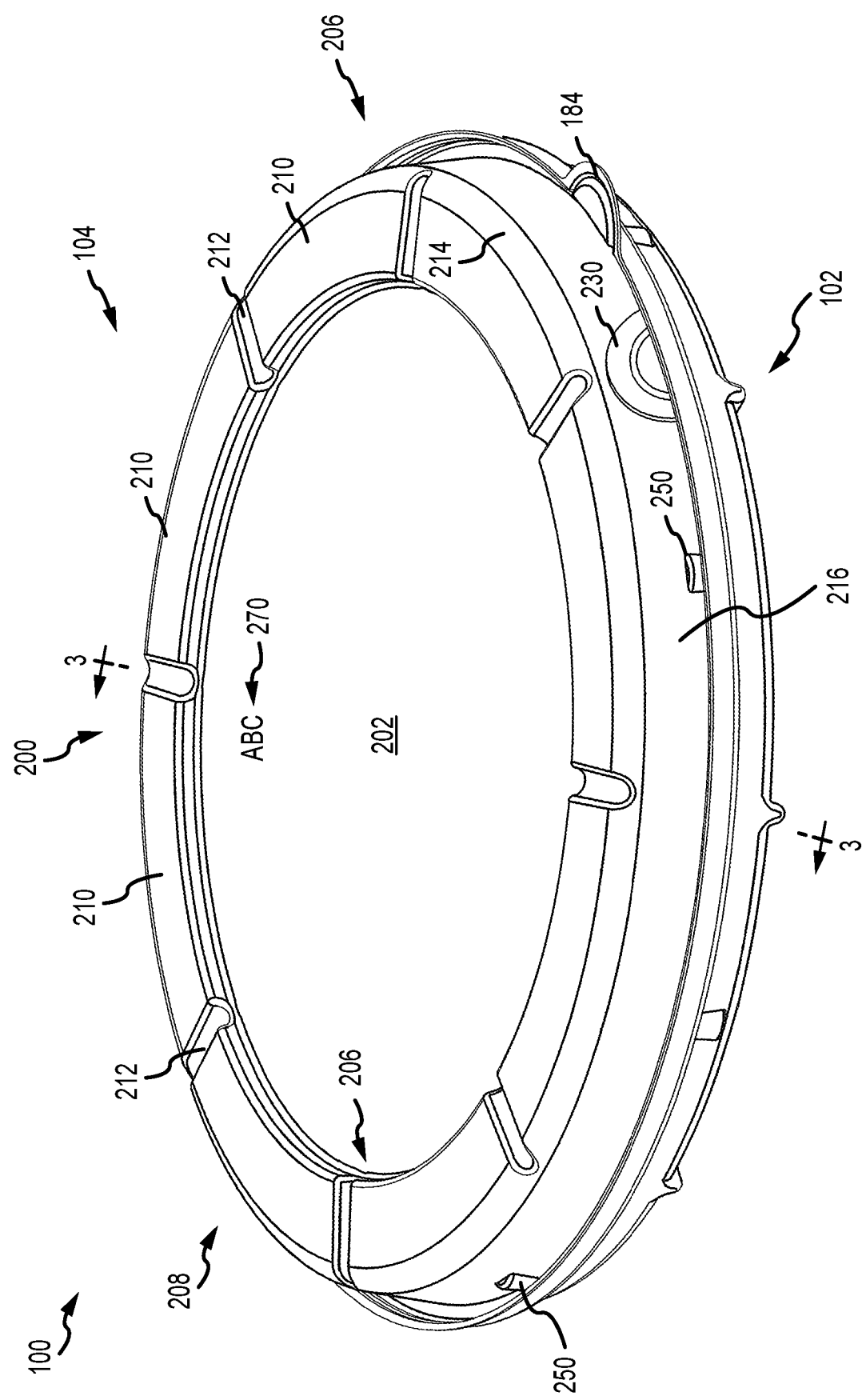
FIG. 1 depicts a perspective view of an example of a food container.

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

One or more implementations of the present disclosure are directed to providing food containers which preserve the quality of a food product for a duration of time, and which optionally allow for cooking of the food product therein. In one or more implementations, the food containers discussed herein are structurally sturdy, stackable, thermally insulating, disposable (e.g., compostable) and require minimal or no manual labor to assemble. In some implementations, the food containers discussed herein use a relatively small amount of material compared to existing corrugated cardboard containers, which material is compostable and/or recyclable.

FIG. 1-FIG. 27 show various views of a food container 100 and components of the food container. The food container 100 is described and illustrated as a container for containing a pizza for explanatory purposes, but it should be appreciated that the present disclosure is not limited to such.

Figure 2:
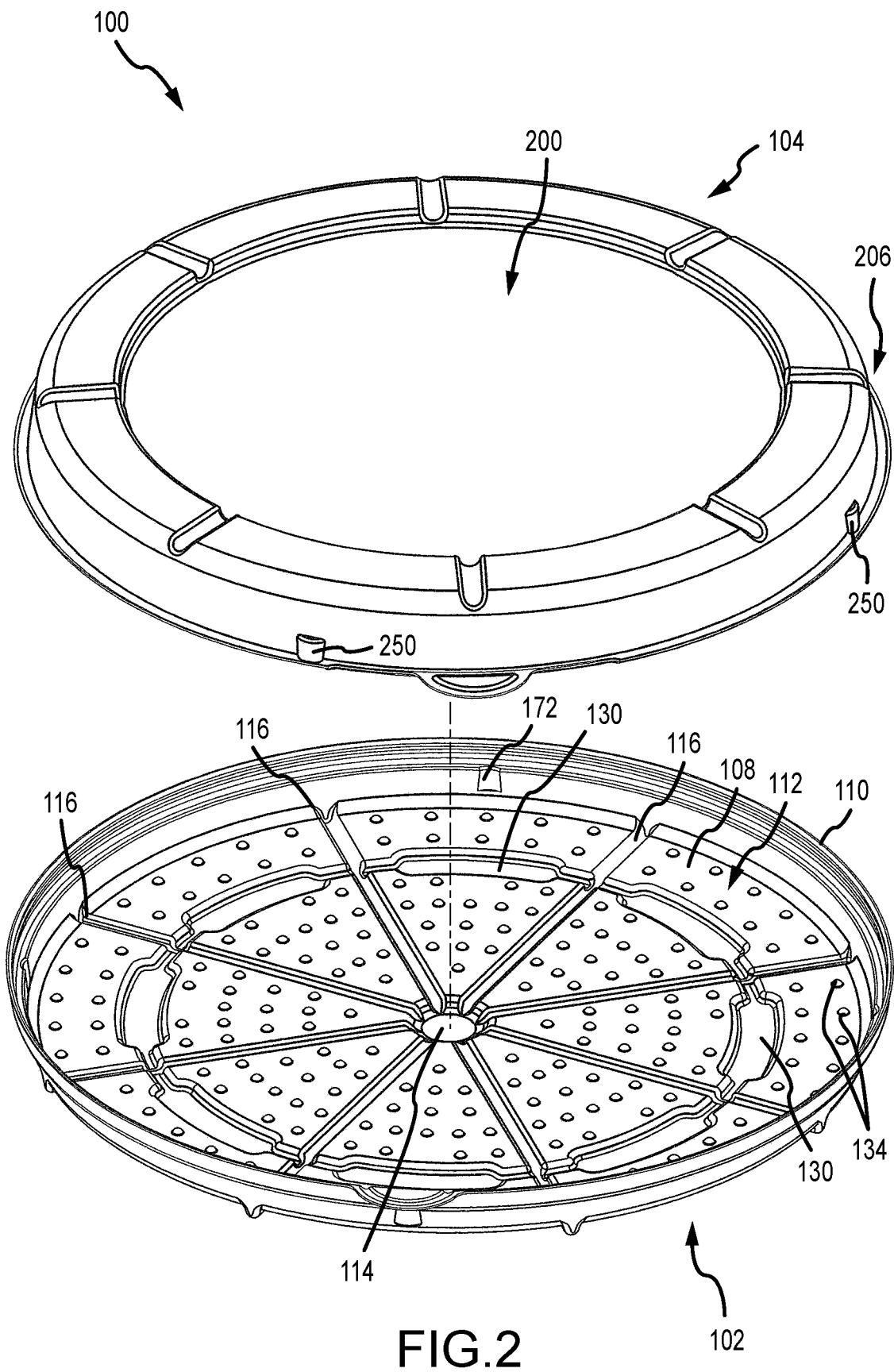
FIG. 2 depicts an exploded perspective view of the food container of FIG. 1.

FIG. 1 is a top perspective view of the food container 100 in a closed condition, according to an illustrated implementation. The food container 100 includes a base 102 and a separate cover 104. FIG. 2 is a top perspective view of FIG. 1, where the cover 104 of the container 100 is separated from the base 102. In the illustrated implementation, the cover 102 and the base 104 are circular. In other implementations, the cover 102 and the base 104 may have other shapes, such as rectangular, triangular, and octagonal, for example. In addition, in other implementations, the base 102 may be a food supporting apparatus for serving and supporting food in restaurants and at home, for example with or without the cover 104. Furthermore, the food container 100 in the illustrated implementation has a width greater than a height, as shown in FIG. 1, for example. In other implementations, the width of the food container 100 may be equal to the height or greater than the height. The food container 100 may be a cup for beverages, for example.

Figure 3:
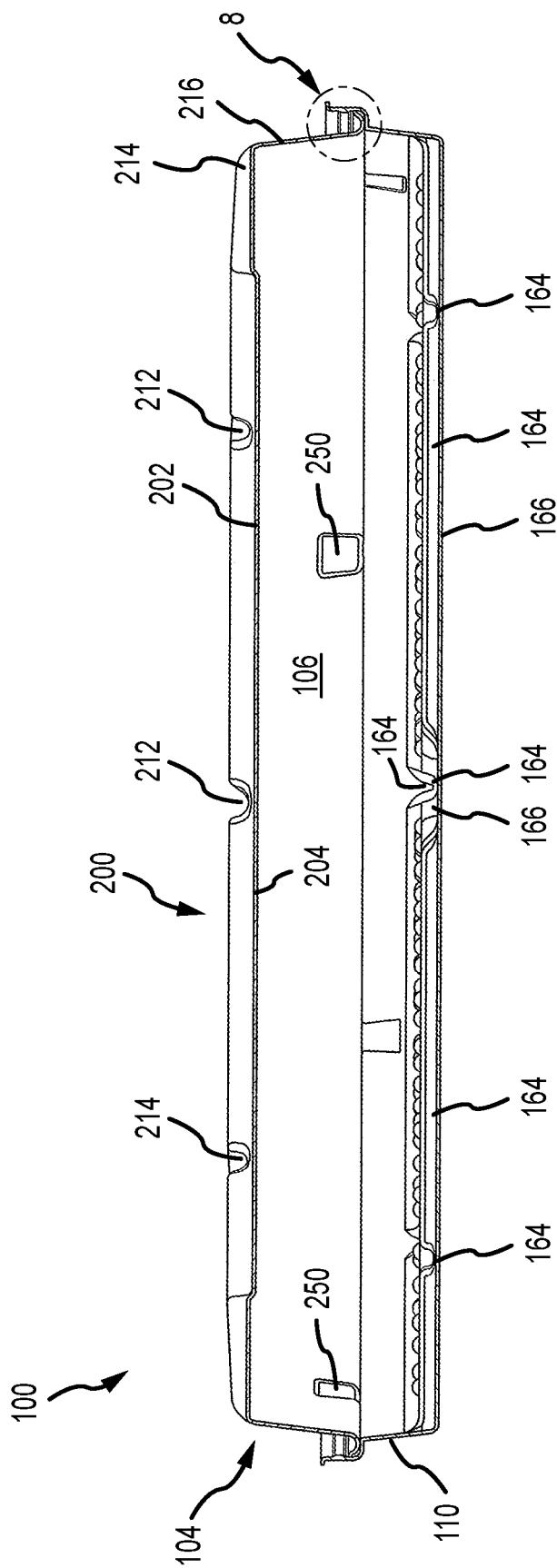
FIG. 3 depicts a section view of the food container of FIG. 1.

FIG. 3 is a sectional view of the container 100 through line 3-3 of FIG. 1. As shown in FIG. 3, the container 100 defines a closed chamber 106 between the interior surfaces of the base 102 and the top 104 for supporting, protecting, insulating, and optionally cooking a food product, such as pizza, for example. FIG. 3 also shows a connecting section 8 between the base 102 and the cover 104, which is discussed in more detail with respect to FIGS. 8 and 9, for example.

In some implementations, the base 102 and cover 104 may each be separately formed of a single layer of liquid-resistant insulating material including, but not limited to, molded sugarcane fiber ("bagasse"), molded wood fiber, molded bamboo fiber, molded paper or plastic (e.g., biodegradable plastic, thermoplastic material, bio-based plastic, recycled plastic, recyclable plastic). The base 102 and/or the cover 104 may be opaque, semi-transparent, or transparent (e.g., an opaque base 102 made with molded fiber and a cover 104 made with transparent plastic material). This is in contrast to conventional pizza boxes, which are made from corrugated cardboard.

In implementations where the base and the cover are formed from molded fibers, the single layer of material may have a relatively small thickness from about 0.5 mm to about 2.0 mm, such as 0.8 or 1.0 mm, for example.

In implementations where the base 102 and cover 104 are formed from plastic (e.g., polyethylene terephthalate (PET), polylactic acid (PLA)), the single layer of material may have a thickness of 0.5-0.6 mm or less, or example. The cover 104 and the base 102 may be of thermoplastics by thermoforming, for example.

Figure 4:
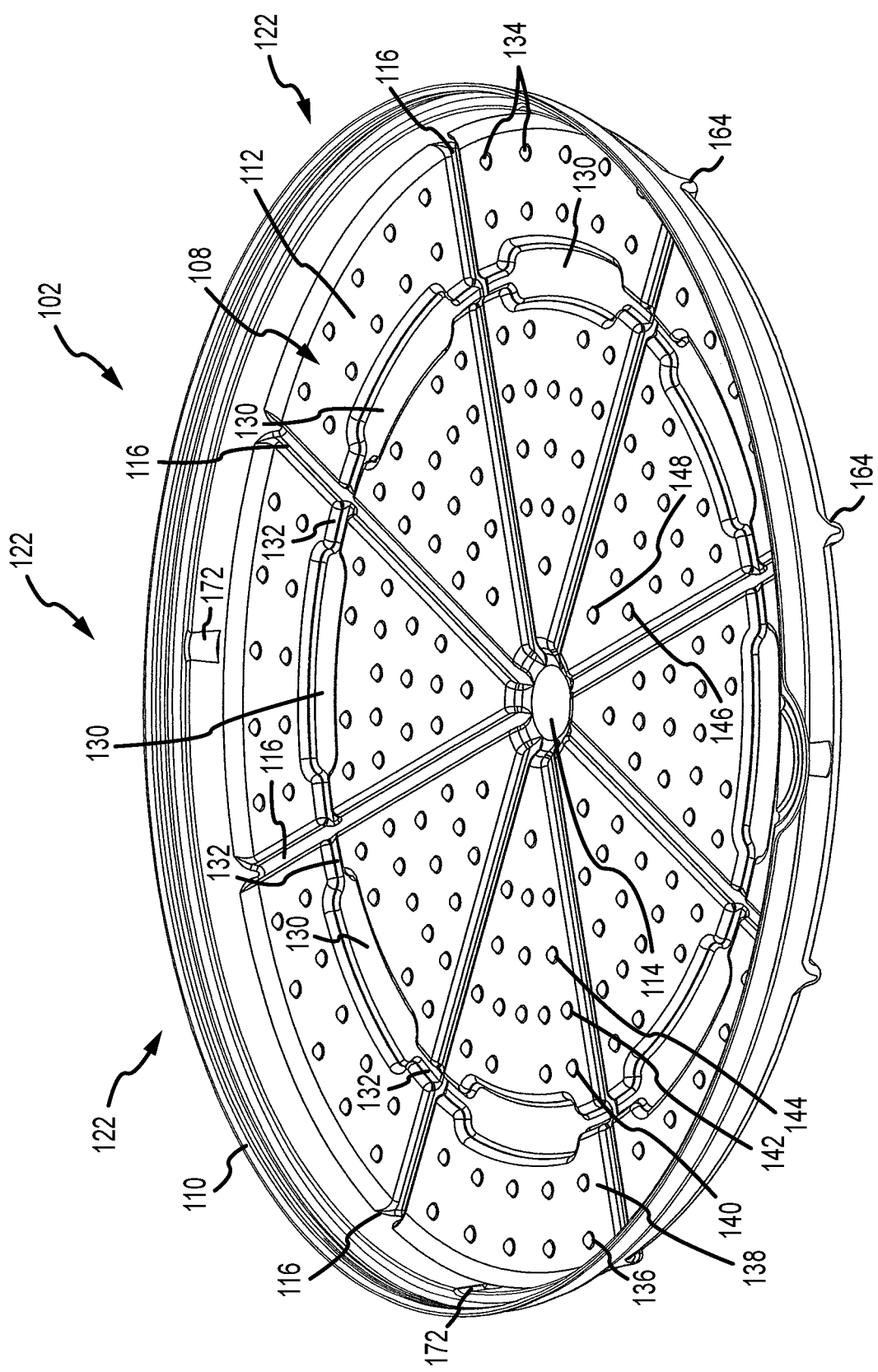
FIG. 4 depicts a perspective view of a base of the food container of FIG. 1.
Figure 5:
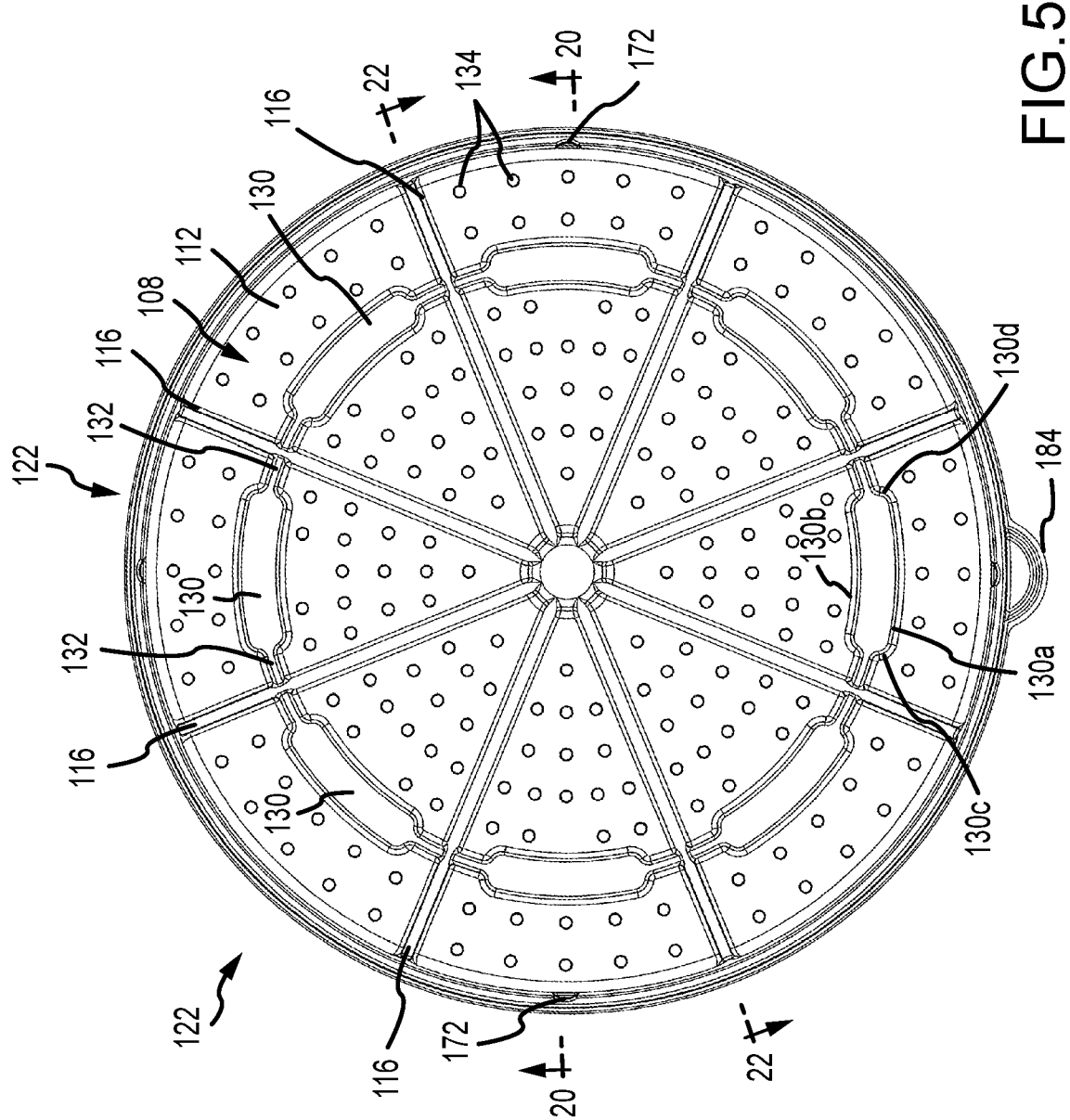
FIG. 5 depicts a top view of the base of FIG. 4.

FIG. 4 is a larger perspective view of the base 102 than in FIG. 2. FIG. 5 is a top view of the base separated from the cover 104. As shown in FIGS. 2-5, for example, the base 102 includes a food-receiving portion 108 that is upwardly facing and circular-shaped in the illustrated implementation. The food-receiving portion 108 is configured to receive pizza or other food item thereon. The base 102 further includes a sidewall 110 extending upward from a perimeter of the food-receiving portion 108. While in the illustrated implementation, the food-receiving portion 108 is circular, in other implementations the food-receiving portion 108 may have other shapes, such as rectangular, triangular, or octagonal, for example.

The food-receiving portion 108 has a planar surface 112 and a number of features that extend at least one of upward or downward from the planar surface, as described herein. For example, a central well 114 extends downwardly from the planar surface 112 to receive liquid drippings or condensation from the cooked food placed in the food container 108. In the illustrated implementation, the central well 114 has a circular perimeter, but the central well may have other shapes, such as triangular, rectangular, or octagonal.

Multiple radial channels or grooves 116 extends downward below the planar surface 112. Each radial channel 116 extends radially inward from the upwardly extending sidewall 110, to the central wall 114. Each radial channel 116 forms a continuous fluid pathway to the central well 114, to convey liquid drippings and condensation to the central well, away from the food on the food-receiving portion 108. In some implementations, each radial channel 116 slopes downward from the upwardly extending sidewall 110, toward the central well 114, to facilitate fluid flow toward the central well. In the illustrated implementation, each of the plurality of radial channels have a U-shaped cross-sectional profile, but in other implementations, the channels may have other shapes (e.g., V-shaped).

Adjacent radial channels 116, a corresponding portion of the upwardly extending wall 110, and a corresponding portion of the food-receiving portion 108 between adjacent radial channels delineate respective sector portions 122 of the food-receiving portion 108. Sector portions 122 support respective portions of a food item, such as individual slices of pizza, for example. In the illustrated implementation, the base 102 includes eight (8) pairs of channels defining in part, eight sector portions. Generally, the base 102 may include N pairs of channels defining N sector portions, where N is a positive integer. The plurality of radial channels 116 are equally spaced in the illustrated implementation to enable cutting of the food item into equally sized pieces when a cutting tool, such as a knife, moves along the channels. Since the radial channels 116 extend downward from the planar surface 112, a user may cut through the food item, over the radial channels, without damaging (e.g., cutting) the food-receiving portion 108 of the base 102. An example of a cutting system that may be used to cut pizza or other food items on the food-receiving portion is described in U.S. Patent Publication No. 2018/0071939 A1, which was filed on Nov. 9, 2017, is assigned to the assigned the present application, and is incorporated by referenced herein. A traditional rolling pizza cutter or other cutting knives may also be used.

Because the radial channels 116 may be substantially covered by the food item placed on the food receiving portion 108, indicia (e.g., visible and/or tactile markings) (not shown) may be positioned on or adjacent a peripheral rim of the upstanding wall radially in line with the radial channels 116 to aid the user in cutting the pizza into pieces along the radial channels 116 with a machine or manually. In such an implementation, tactile indicia are provided in the form of indented portions at the top of the upstanding sidewall 110. Such indented portions may have a U-shaped cross-sectional profile, or profiles of other shapes (e.g., V-shaped).

In the illustrated implementation, an elongated well 130 is provided in each sector portion 122 to collect liquid drippings and condensation from the cooked food product in each sector portion. Each elongated well 130 in a respective sector portion 122 is in liquid communication with the radial channels 116 defining the respective sector portion via circular channels 132. The elongated wells 130 and circular channels 132 in each sector 122 are arranged along an imaginary circle having a same center as the central well 114. Liquid/condensation collecting in an elongated well 130 may drain into either or both adjacent radial channels 116 via a circular channel 132. From the radial channel 116, the liquid/condensation may drain into the central well 114, as discussed above. In the illustrated implementation, the elongated wells 130 have the shape of a curved obround, where each well has opposing parallel sides 130a, 130b and opposing semi-circular ends 130c, 130d.

In the illustrated implementation, only one elongated well 130 is provided in each sector portion 122. In other implementations, more than one elongated well may be provided in each sector portion 122, in fluid communication with the adjacent radial grooves 116 and positioned along other imaginary circles concentric with the central well 114. In other implementations, each elongated well 130 in each sector 122 may not be curved or may be in a different location. The elongated well 130 may have the shape of an oval or a rectangle, for example. The wells need not be elongated, and may be a circle or circular, a triangle, an octagon, etc. The channels connecting wells to radial channels 116 may be straight instead of being circular.

In one implementation, the bottom surfaces of each of the elongated wells 130 and the circular channels 132 are equally distant from the planar surface 112 over their entire lengths. This maximizes the amount of liquid that can collect in the elongated wells 130.

The radial channels 116, the elongated wells 130, and the circular channels 132 increase the rigidity of the food container 100, contributing to the strength of the food container 100.

In the illustrated implementation, a plurality of dome-shaped protrusions 134 extend upward from the planar surface 112 in each sector portion 122, as shown in FIGS. 2 and 4, for example. In other implementations, the protrusions 134 may have other shapes. Seven rows 136, 138, 140, 142, 144, 146, 148 of protrusions 134 are provided in this implementation, five rows 136, 138, 140, 142, 144 between the central well 114 and the elongated wells 132 and two rows 146, 148 between the elongated wells and the upstanding wall. Five (5) protrusions 134 are provided in the row 136 and in the row 138. Four (4) protrusions 134 are provided in the row 140 (due to the presence of the central well 114). Five (5) protrusions 134 are provided in the row 142. Three (3) protrusions are provided in the row 144 and in the row 146. One (1) protrusion 134 is provided in the row 148. The protrusions 134 in the rows 138, 140, 142, 144, 146, 148 are radially aligned while the protrusion in the first row 136 is centered within the sector portions 122. The protrusions 134 may have different shapes, more or fewer rows of protrusions may be provided, and different numbers of protrusions may be provided in the different rows.

The protrusions 134 slightly raise the food product supported on the planar surface 112, decreasing heat loss due to conduction through the planar surface compared to food containers with flat bottom surfaces that have relatively large surface area contact with the bottom surface of the food product. In addition, the protrusions 134 tend to isolate the bottom surface of the food product from the planar surface 112, which prevents the food product from becoming soggy due to trapped liquid on the planar surface. The protrusions 134 also slightly tilt portions of the food product towards the radial channels 116 and the elongated wells 130 so that liquid drippings from the food item fall away from the food item and into the radial channels and the elongated wells. This facilitates drainage of liquids into the respective components, decreasing or eliminating sogginess due to trapped liquid on the planar surface 112 of the food receiving portion 108.

The protrusions 134 in the rows of protrusions may also aid in supporting the food item near the cutting locations along the pairs of radial channels 116, thereby facilitating the cutting process to provide accurate individual pieces.

Thus, the aforementioned features of the food container 100 provide a housing that is lightweight, sturdy, compostable, and supports the food item in a manner which keeps the food item in a hot and dry condition, which preserves the freshness of the food item. In some implementations, these characteristics are provided in a food container 100 comprising compostable fiber.

In some implementations, each of a plurality of features of the base 102 comprising the central well 114, the elongated wells 130, and the circular channels 132 are spaced apart from at least one other of the plurality of features by a distance which is less than or equal to one inch (25.4 mm). In some implementations, due to the aforementioned plurality of features, the food receiving portion of the base does not have a continuously planar surface which exceeds 2 inches by 2 inches (50.8 mm×50.8 mm). Such features significantly improve the strength of the base 102, while allowing the base 102 to have a length dimension greater than 12 inches (30.48 cm) (e.g., 16 inches), a width dimension greater than 12 inches (30.48 cm) (e.g., 16 inches), an overall height which is less than 1.5 inches (38.1 mm) (e.g., 1 inch) (25.4 mm), and a material thickness between 0.5 mm and 1.0 mm (e.g., 0.8 mm). In other implementations, the base 102 may have a relatively larger height and the cover may have a relatively smaller height.

Figure 6:
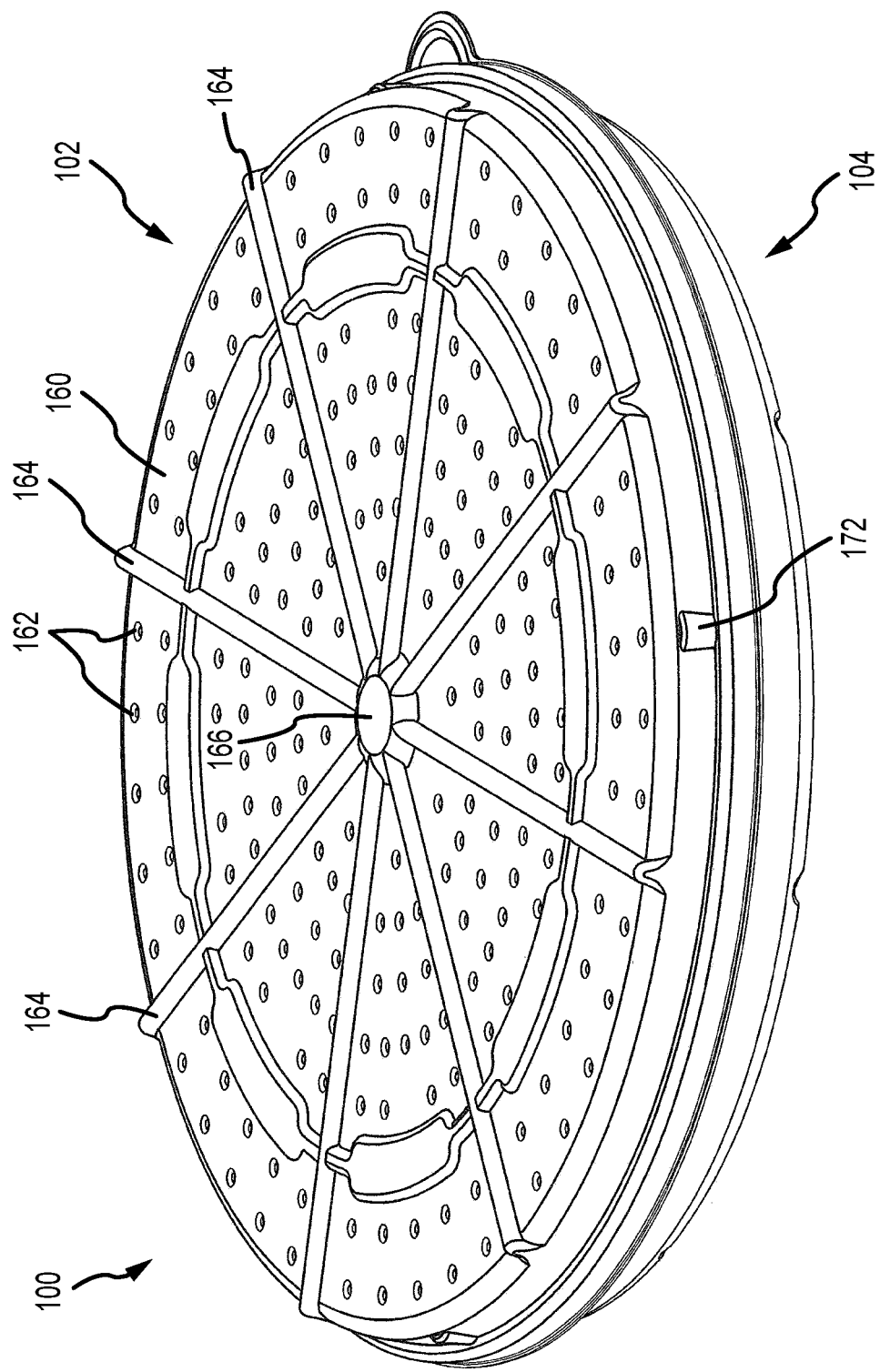
FIGS. 6 and 7 depict inverted perspective views of the food container of FIG. 1.
Figure 7:
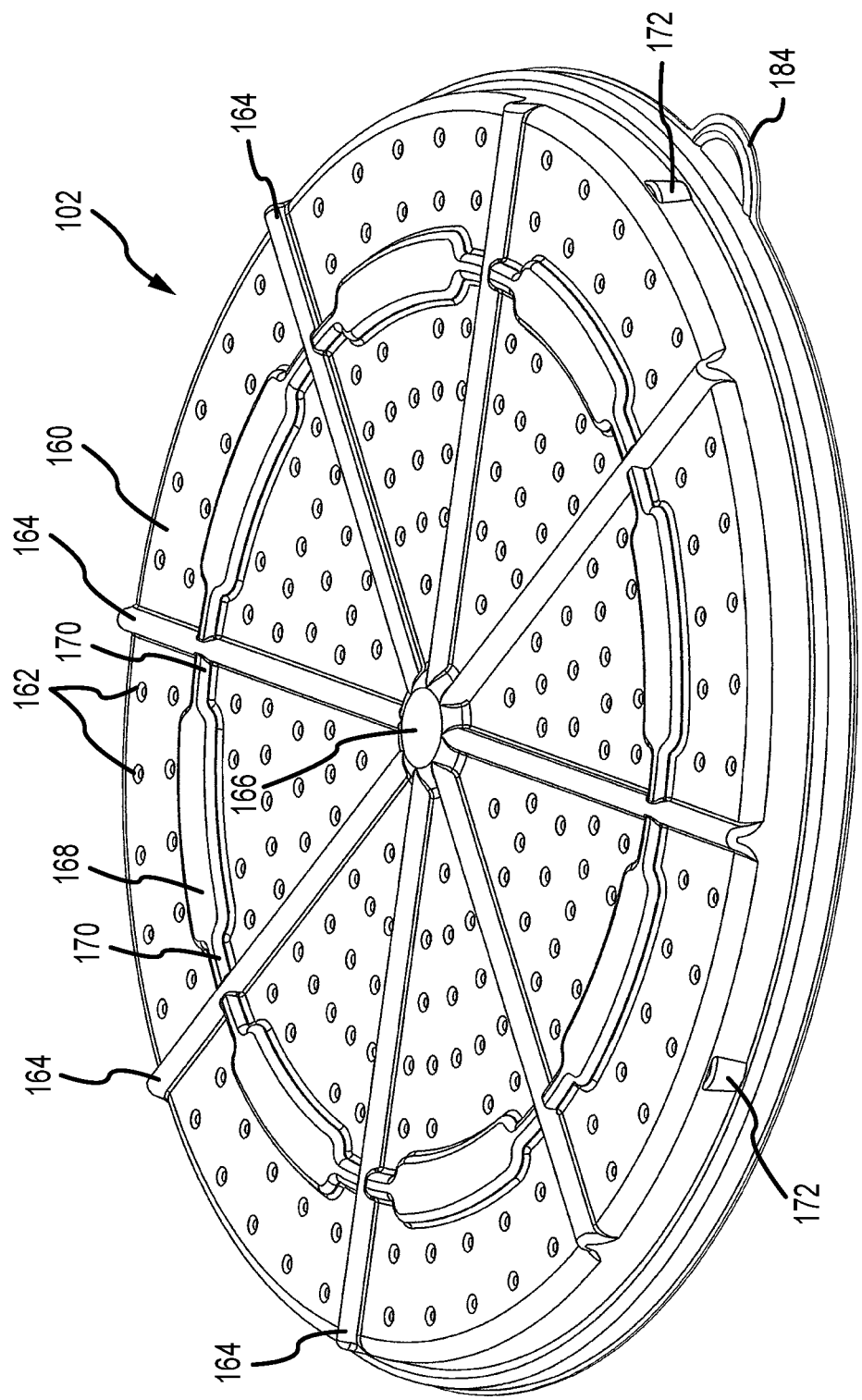

FIG. 6 is a bottom perspective view of the food container 100 of FIG. 1. FIG. 7 is a bottom perspective view of the base 102. FIGS. 6 and 7 show the configuration of the bottom surface 160 of the base 102. In the illustrated implementation, the protrusions 134 form indents 162 in the bottom surface of the base 102, as shown in FIGS. 6 and 7, for example.

The central well 114 and the radial channels 116 protrude from the bottom surface 160 of the base 102. The protruding radial channels 116 form weight-bearing legs 164 for supporting the base 102 and the food container 100 when the base 102 is disposed on a resting surface, such as a countertop, oven or another food container, for example, as shown in FIGS. 2 and 3, for example. In the illustrated implementation, the protruding central well 114 also forms a weight-bearing leg 166, which also supports the based 102 and the food container 100 when the base 102 is disposed on a resting surface.

In the illustrated implementation, the protruding elongated portions 168 corresponding to the elongated wells 130 and the protruding circular portions 170 corresponding to the circular channels 132 protrude a lesser distance from the bottom surface 150 of the base 102 than the legs 164, 166 and do not form weight-bearing legs. In other implementations, the protruding elongated portions 168 protrude from the bottom surface 160 the same distance as the legs 164, 166 to form weight-bearing supports to further support the food-receiving portion 108 when the base 102 is disposed on a resting surface. The protruding circular channels 168 may also protrude a sufficient distance to provide such support.

The weight-bearing legs 164, 166 also provide air spaces below the food item, which provides additional insulation to that provided by the features of the food container 100 discussed above. The legs 164, 166 also strengthen the rigidity of base 102. Additionally, the weight-bearing legs 164, 166 raise the remainder of the base 102 (and cover 104 when engaged with the base) slightly above a resting surface, which causes a shadow to be cast, similar to a more formal serving plate.

In the illustrated implementation, the base 102 includes one or more spaced apart denesting lugs 172 protruding outward from the external surface of the sidewall 110, as shown in FIGS. 6 and 7. The denesting lugs 172 may be spaced apart from each other at uneven intervals around the circumference of the exterior surface of the sidewall 110. The interior surface of each denesting lugs 172 is indented at the location of the protruding denesting lugs, as shown in FIGS. 2, 4, and 5, for example. The denesting lugs 172 operate to make it easier for a user to separate the covers from one another when stacked, as discussed above. Thus, for example, a manufacturer of the bases 102 may provide a number of the bases 102 stacked together which may be easily separated prior to use. In particular, the denesting lugs 172 provide spacing between two stacked bases 102, which allows for ease in grasping of only one of the covers by an individual or a machine. In the illustrated implementation, the denesting lugs 172 are evenly spaced. In other implementations, the denesting lugs 172 may be unevenly spaced to reduce the likelihood that the denesting lugs 172 of one base 102 will align with and fit into the denesting lugs 172 of another bases 102, which would cause the denesting lugs 172 to fail to provide the intended spacing between the bases 102.

As mentioned above, FIG. 3 shows a connection between the cover 104 and the base 102 in Section 8. FIG. 8 is an enlarged view of Section 8, showing a fastening rim 174 at the top of the sidewall 110 of the base 102. FIG. 9 is an enlarged view of the fastening rim 218 of the cover 104 positioned above the fastening rim 174 of the base 102 prior to attachment of the cover 104 to the base 102.

The fastening rim 174 of the base 102 includes a first engaging wall 174a to engage with a second engaging wall 220 of the fastening rim 218 of the cover 104. In the illustrated implementation, the first engaging wall 180 includes a second outer sidewall 178 extending upward from the sidewall 110. In the illustrated implementation, the fastening rim 174 further includes a horizontal, planar portion 180 that displaces the second, outer sidewall 178 from the sidewall 110, forming a receiving region 176 with the second, outer sidewall 178. A horizontal flange 182 extends outward from a curved shoulder 183 at an upper portion of the second outer sidewall 178. An interior surface 185 of the second, outer sidewall 178 includes an inwardly extending protrusion 186. Connection of the cover 104 to the base 102 is discussed further below.

While in the illustrated implementation, the fastening rim 174 of the base 102 forms the receiving region 176 to receive a fastening rim 218 of the cover 104, in other implementations, the fastening rim 218 of the cover 104 may form the receiving region and the fastening rim 174 of the base 102 may be received in the receiving region of the cover.

Returning to FIGS. 1, 2, and 4, the base 102 includes a first tab 184 that extends outwardly from the outwardly extending flange. The tab 184 is planar and has a curved shape, such as a semi-circular shape. The tab 184 may be grasped by a customer to facilitate removal of the cover 104 from the base 102, as discussed further below.

Figure 10:
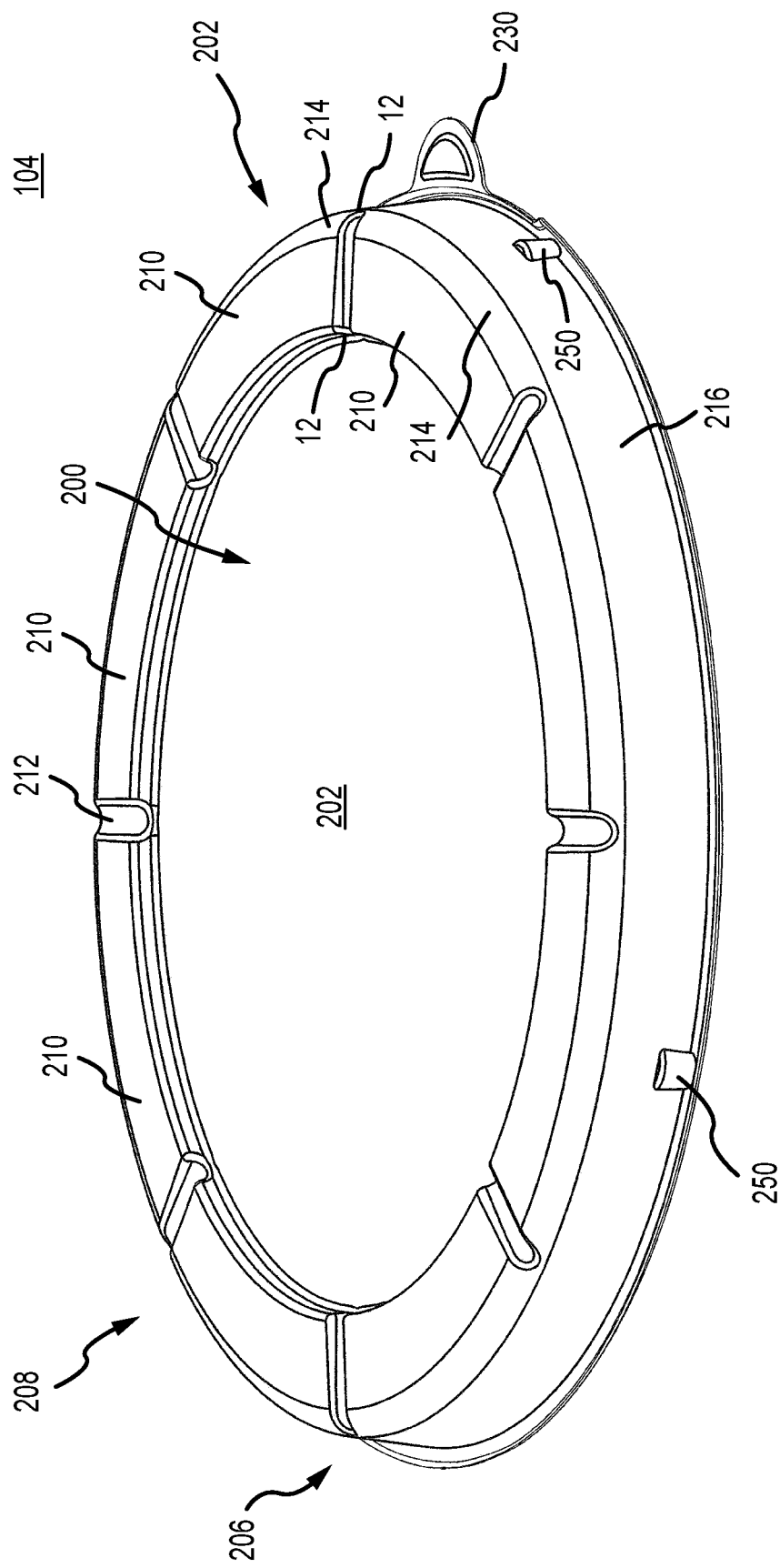
FIG. 10 depicts a perspective view of a cover of the food container of FIG. 1.
Figure 11:
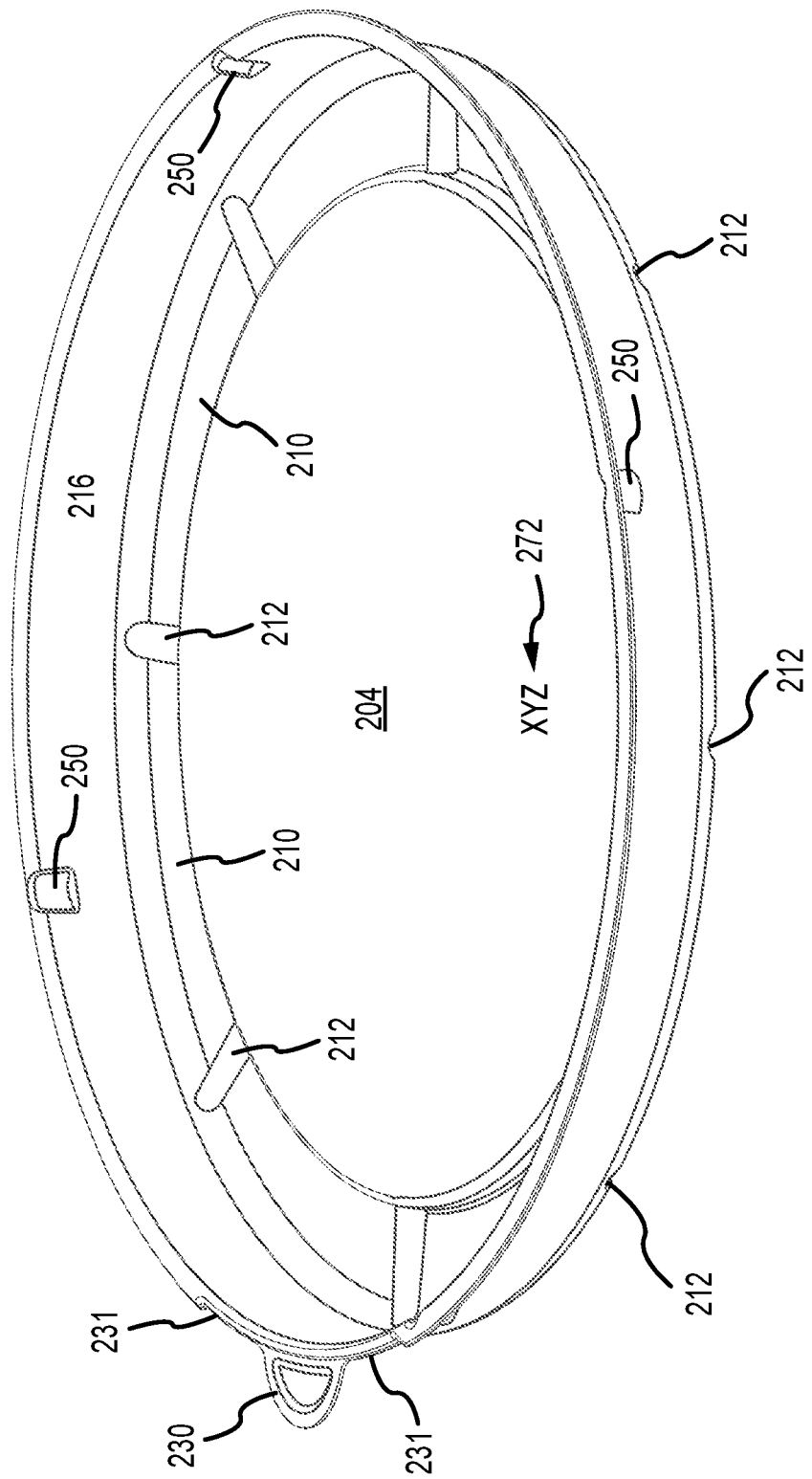
FIG. 11 depicts an inverted perspective view of the cover of FIG. 10.

FIG. 10 is a perspective view of the cover 104. As shown in FIG. 10, as well as in FIGS. 1, 2, and 3, for example, the cover 104 of the container 100 includes an elevated portion 200 having a substantially upwardly facing exterior surface 202 that is substantially planar in the illustrated implementation. The cover 104 also includes a substantially downwardly facing interior surface 204, which in the illustrated embodiment is also substantially planar, as shown in FIG. 3. At the periphery 206 of the upwardly facing exterior surface 202 is an upwardly facing circumferential section 208 that is raised with respect to the substantially upwardly facing exterior surface 202. The upwardly facing circumferential section 208 comprises segments 210 that are separated by partial radial grooves 212. In the illustrated implementation, eight (8) segments 210 are provided. In the illustrated implementation, the number of segments 210 corresponds to the number of sector portions 102. FIG. 11 is a bottom perspective view of FIG. 10. The segments 210 each have a downwardly curved outer shoulder 214 between the inner radial grooves 212. The downwardly curved outer shoulders 214 terminate in a sidewall 216.

At the bottom of the second sidewall portion 216 is a fastening rim 218 to be received by the receiving region 176 of the base 102, as best shown in FIGS. 3, 8, and 9. In the illustrated implementation, the fastening rim 218 comprises an upwardly facing curved portion 220 that extends outwardly from the sidewall 216, as best shown in FIGS. 8 and 9. The outer end 222 of the upwardly facing curved portion 220 turns outward, as best shown in FIG. 9. In the illustrated implementation, the upwardly facing curved portion 220 extends completely around the cover 104, although that is not required. In other implementations, the curved portion may face downward or may have other shapes, such as being straight.

The cover 104 includes a second tab 230 that extends outwardly from a section of the upwardly curved portion 220. The tab 230 is planar and has a curved shape, such as a semi-circular shape. A portion 231 of the upwardly curved portion 220 on both sides of the tab 230 is recessed.

Figure 12A:
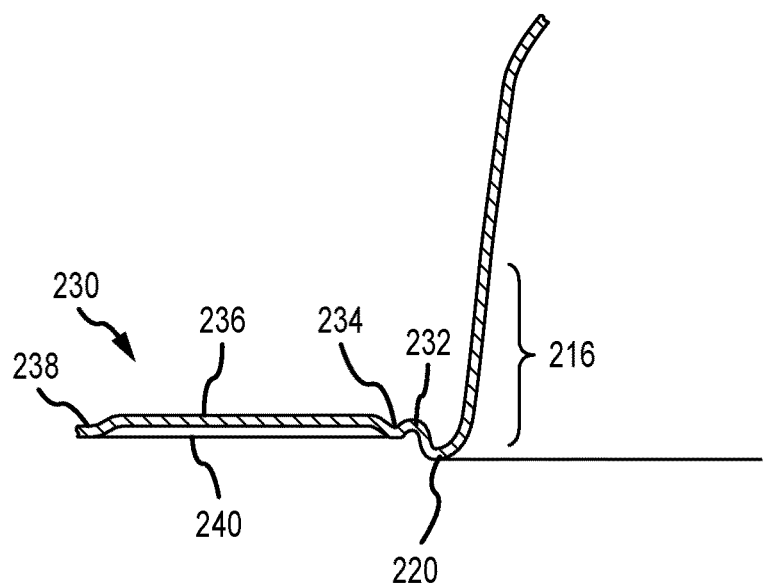
FIG. 12A depicts an enlarged section view of a tab on the cover of FIG. 10.
Figure 13:
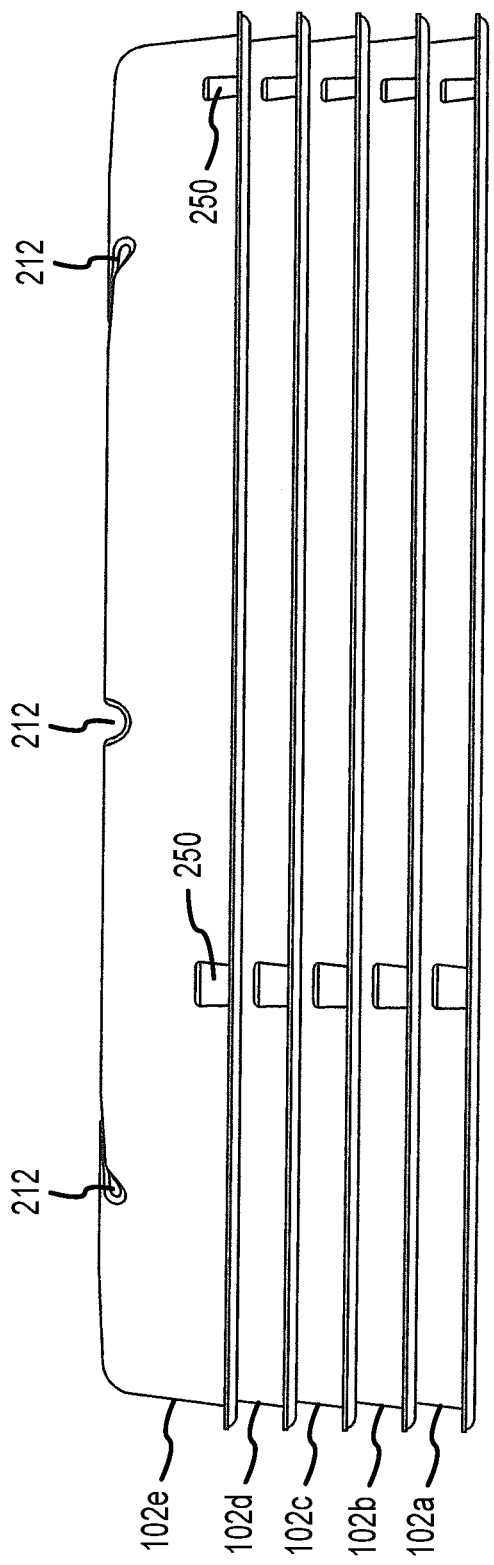
FIG. 13 depicts a plurality of covers in a stacked configuration.

FIG. 12A is a partial cross-sectional view of the cover 204 through line 12-12 of FIG. 10, including the tab 230. The tab 230 extends from the end of the upwardly facing curved portion 220, via a downwardly facing curved portion 232. Adjacent to the downwardly facing curved portion 232 is an upwardly facing curved portion 234. A planar surface 236 extends outward from the end of the upwardly facing curved portion 234. An outer end 238 of the planar surface 236 drops downward, forming a rim around the tab 230. The outer end 238 of the planar surface 236 also forms a recessed region 240 on the underside of the tab 230. As discussed further below, when the cover 104 is attached to the base 104, the upwardly facing curved portion 230 is rotated upward, around the downwardly facing curved portion 232, which acts as a hinge. When a plurality of covers 204 are in a stacked configuration (e.g., as depicted in FIG. 13), the tabs 230 thereof extend in a generally horizontally orientation, as depicted in FIG. 12A.

Figure 12B:
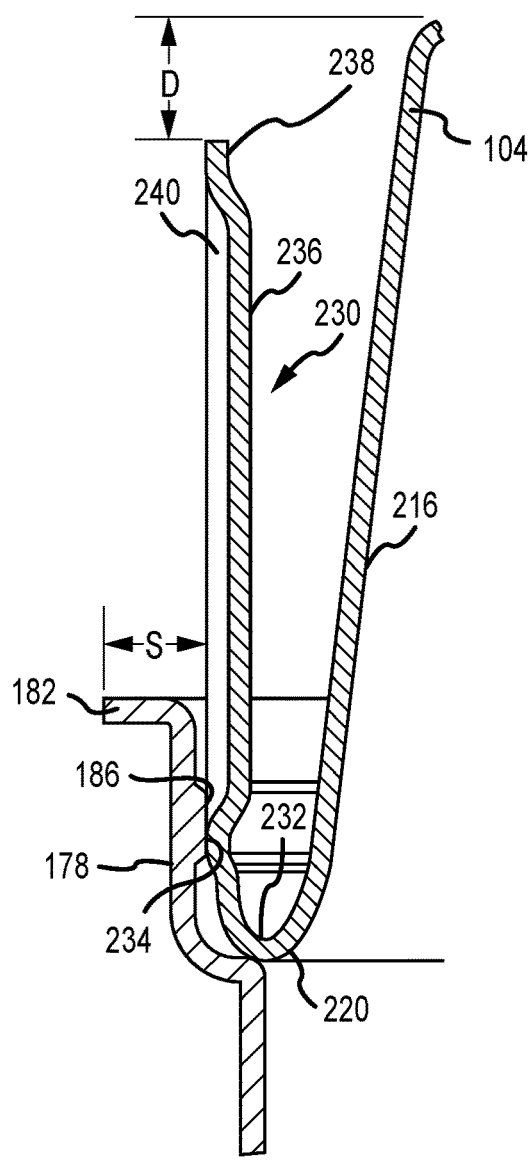
FIG. 12B depicts an enlarged section view of the assembled fastening rim of the food container of FIG. 1.

When the container 100 is closed, as shown in FIG. 1, the tab 230 is folded upward by the fastening rim 174 of the base 102 so that the tab 230 points upward, as shown in FIG. 12B. In particular, when the tab 230 contacts the horizontal flange 182 of the second sidewall 178, the tab 230 folds upward as the upwardly curved portion 220 is pushed further downward. When the upwardly curved portion 220 passes the protrusion 186, and the tab 230 rotates about the hinge 232, the outer surface of the upwardly facing curved portion 234 moves into contact with the protrusion 186. The upwardly folded tab 230 facilitates opening of a closed food container 100 as the tab 230 may be grasped by a user and pulled upward, facilitating removal of the cover 104 from the base 102, as discussed further below. In the illustrated implementation, the second tab 230 is offset from the first tab 184.

When in the closed configuration depicted in FIG. 12B, the substantially vertical orientation of the tab 230 provides a visual indication that the cover 104 is, in fact, secured to the base 102. Further, the dimensions of the tab 230, relative to the cover 104 and the base 102, prevent the tab 230 from being contacted and potentially dislodged, during transport, stacking, or storage. For example, when in the vertical orientation, the tab 230 has a height that is less than the height of the circumferential section 208 of the cover 104. Since the circumferential section 208 defines the highest point of the cover 104, the vertical tab 230 is disposed at a distance D below that uppermost portion. As such, when a plurality of food containers are stacked on top of each other, as depicted elsewhere herein, dislodgement of the tab 230, due to contact with a base 102 being stacked on the cover 104 is unlikely to occur. Similarly, when in the vertical orientation, the tab 230 is set inward from an outermost expanse of the base 102, e.g., as defined by the horizontal flange 182. This separation S reduces the likelihood that the tab 230 might become dislodged due to contact with adjacent food containers or other structures. This allows the food container (or stacks thereof) to be more easily transported (for example, in an insulated bag, or by hand in close quarters) while reducing the likelihood of disengagement of the cover 104 from the base 102.

In the illustrated implementation, the cover 104 includes one or more spaced apart denesting lugs 250 protruding from the external surface of the sidewall 216, as shown in FIGS. 10 and 11, for example. An indent is provided on the interior surface of the upstanding wall 216 during molding of the denesting lugs 250. The denesting lugs 240 may be spaced apart from each other at uneven intervals around the circumference of the exterior surface of the sidewall 216. The denesting lugs 250 operate to make it easier for a user to separate the covers 140 from one another when stacked, as discussed above with respect to stacked bases 102. Thus, for example, a manufacturer of the covers 104 may provide a number of the covers stacked together which may be easily separated prior to use. In particular, the denesting lugs 250 provide spacing between two stacked covers, which allows for ease in grasping of only one of the covers by an individual or a machine. In the illustrated implementation, the denesting lugs 250 are evenly spaced. In other implementations, the denesting lugs 250 are unevenly spaced to reduce the likelihood that the denesting lugs of one cover 104 will align with and fit into the denesting lugs of another cover stacked on the first cover.

In operation, when the cover 104 is being connected to the base 102, the receiving region 176 defined by the second sidewall 178 of the base 102 receives the upwardly facing curved portion 220 defined by the cover 104. In some implementations, the receiving region 176 and the upwardly facing curved portion 220 are sized and dimensioned so that when the cover 104 is attached to the base 102 by an external force pushing the cover 104 and base 102 together, the upwardly facing curved portion 220 is received in the receiving region 176 via a snap-fit.

In particular, in the illustrated implementation, the second sidewall 178 of the base 104 and the upwardly facing curved portion 220 of the cover are sized and dimensioned so that as the cover 104 is being placed on the base 102, an outer portion of the upwardly facing curved portion 220 or the outer end 222 of the upwardly facing curved portion 220 comes into contact with the horizontal flange 182 or curved shoulder 183 of the fastening rim 174 of the base 102. Pressing of the cover 104 onto the base 102 moves one or both of the upwardly facing curved portion 220 and the second sidewall 174 with respect to the other as the upwardly curved portion 220 enters the receiving region 176. As the cover 104 is pushed down onto the base 102, the outer end 222 of the curved upstanding portion 220 slides down the inner surface wall of the second sidewall 178, over the protrusion 186. The upper portion 186a and the lower portion 186b of the protrusion 186 may be tapered to facilitate passage of the outer end 222 over the protrusion.

When the outer end 222 passes the protrusion 186, one or both of the upwardly facing curved portion 220 and side wall 216 and the second sidewall 178 are moved with respect to each other so that one and/or the other of the upwardly facing curved portion 220 and side wall 216 and the second sidewall 178 bear against the other, locking the upwardly facing curved portion 220 in place beneath the protrusion 186, in a snap-fit, and the bottom of the upwardly facing curved portion 220 rests on the upper surface of the horizontal, planar portion 180. A seal may be formed between the outer edge 222 of the upwardly facing curved portion 220 and the sidewall 178. The external force applying the cover 104 to the base 102 may be applied by a machine or manually, for example.

To open the food container 100, a customer, for example, may pull the second tab 230 on the cover 104 upward while holding the first tab 184 on the base 102. Lifting the tab 230 causes passage of the outer edge 222 of the upwardly curved portion 220 past the inwardly extending protrusion 186 of the base 102 and removal of the upwardly facing curved portion from the receiving region 176 in the region of the second tab. Continued lifting of the second tab 230 removes of more of the cover 104 from the base 102 until the cover 104 is completely removed from the base 102. The tab 230 needs to be initially lifted with sufficient force to break the seal between the cover 104 and the base 102. Since the outer surface of the upwardly facing curved portion 234 of the second tab 230 is in contact with the protrusion 186 in the illustrated implementation, instead of being below it, it is easier to start the removal of the second tab and adjacent parts of the upwardly curved portion 220 from engagement with the second sidewall 178.

For a plastic blister or thermoform package, due to its elastic property, when a fastening or positioning mechanism is separated the mechanism will generate an audio cue (e.g., "snap") to signal the movement. This is due to the "undercut" design, which is a commonly known design technique in the plastic packaging industry. Such is feasible because the plastic molding process allows the undercut design. For paper or molded pulp products, it may not be possible to make such an undercut design, and therefore it is typically accepted that a molded pulp package cannot have any locking design with an audible snap function. However, in some implementations of the present disclosure, due to the combination of the dimensions of the cover and the base, the fastening mechanisms provide an unexpected performance with an audible cue (e.g., "snap") when the fastening protrusions are disengaged from the corresponding fastening recesses.

As discussed above, the base 102 and cover 104 of the food container 100 may be nestable with other bases and covers having the same configuration, respectively, with a height that is much less than the combined height of the individual covers. Numerous covers 104 and bases 102 may be stacked together at a height which is much less than the combined height of the individual covers and bases. Such nesting feature is advantageous for shipping and for storing the food containers 100 in a small space (e.g., restaurant, vehicle, packaging).

Figure 14:
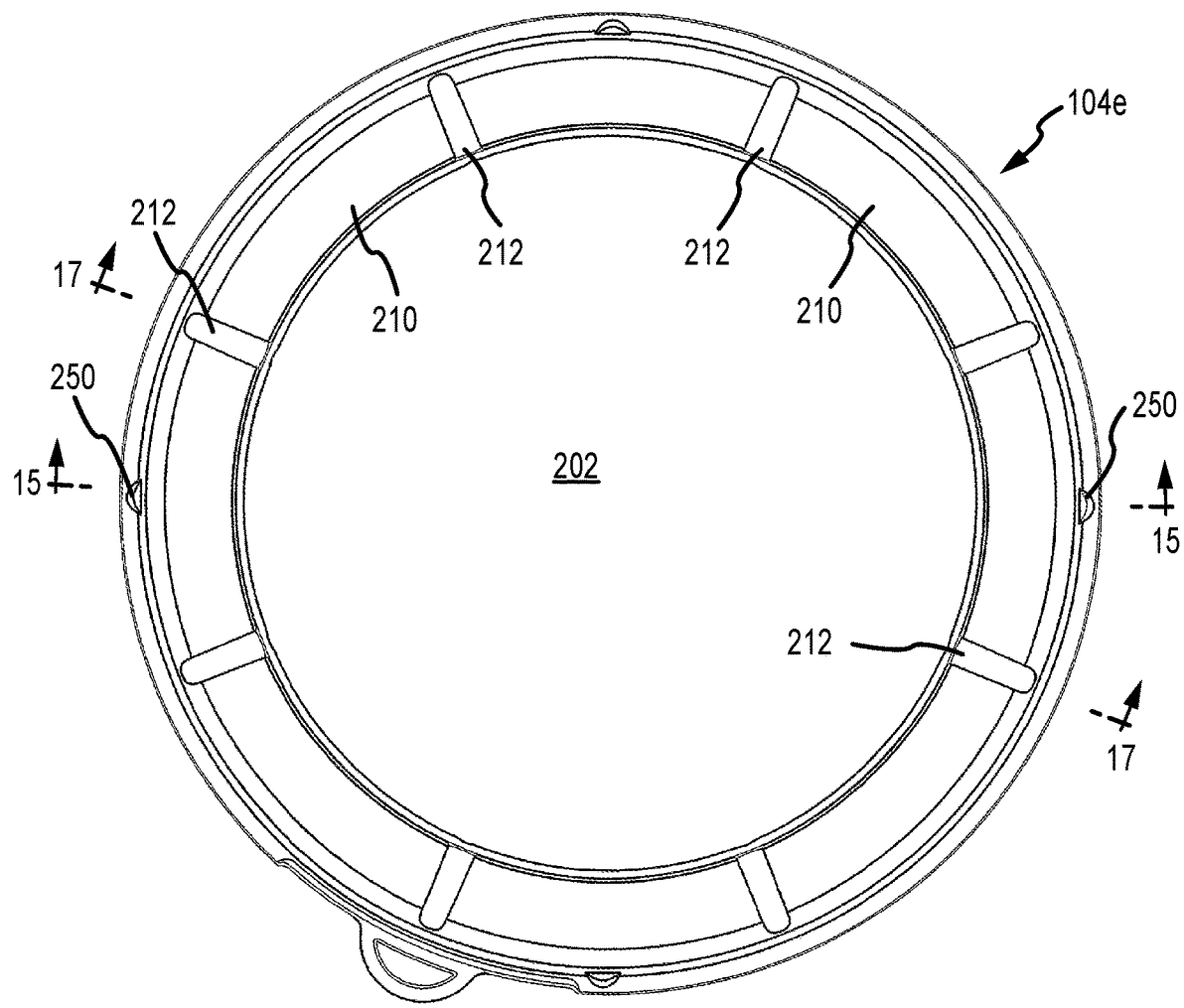
FIG. 14 is a top view of the plurality of stacked covers of FIG. 13.
Figure 15:
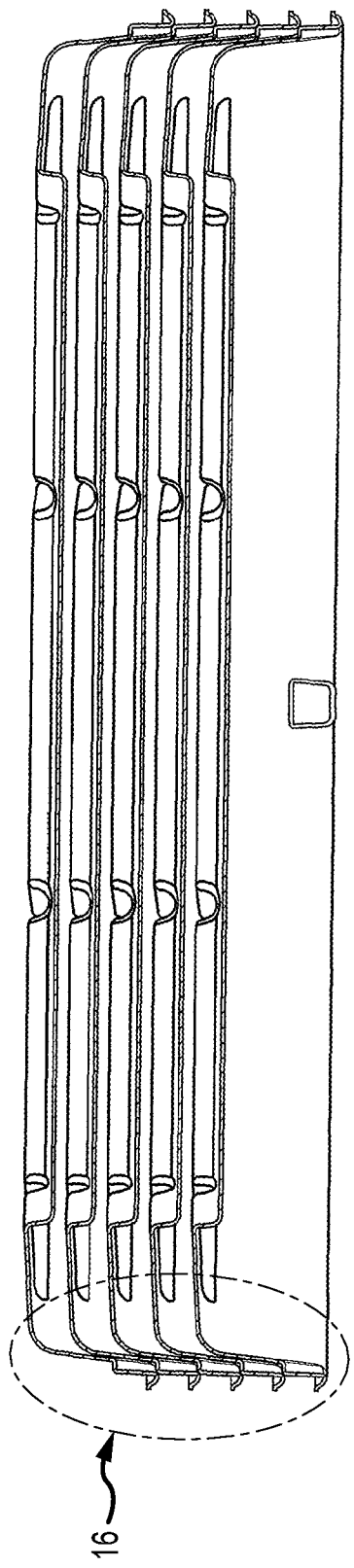
FIG. 15 is a section view of the plurality of stacked covers of FIG. 14.
Figure 16:
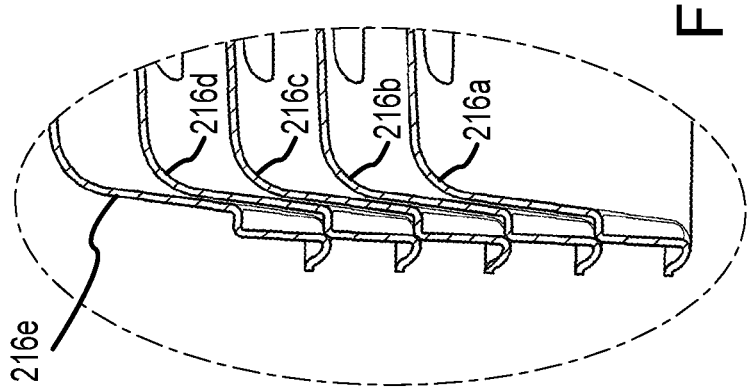
FIG. 16 is an enlarged section view of the plurality of stacked covers of FIG. 15.
Figure 17:
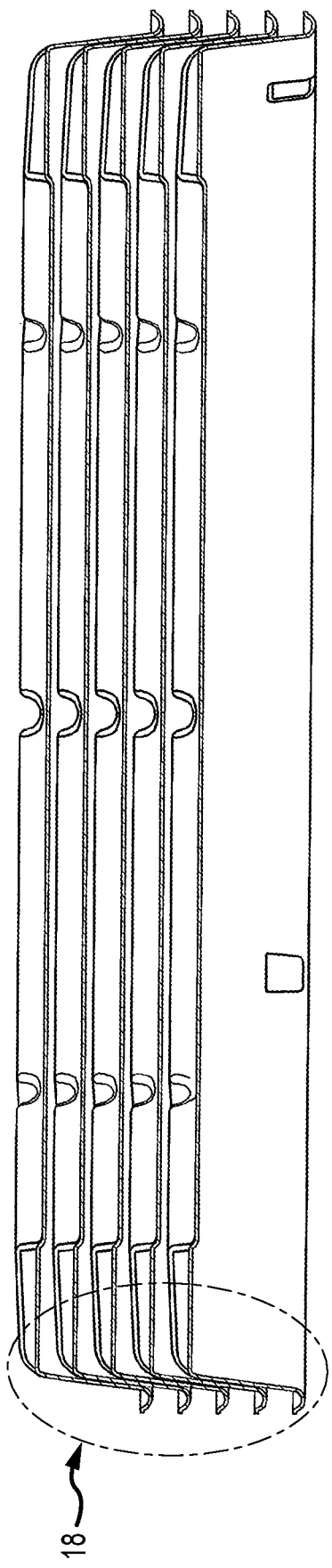
FIG. 17 is a section view of the plurality of stacked covers of FIG. 14.
Figure 18:
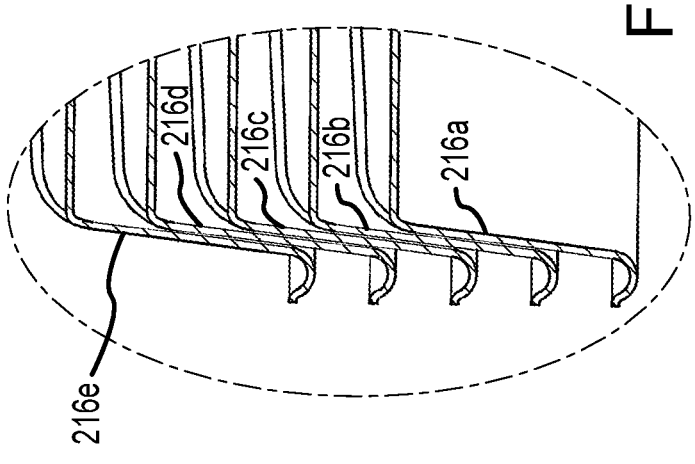
FIG. 18 is an enlarged section view of the plurality of stacked covers of FIG. 17.

FIG. 13 shows a series of stacked covers 104a, 104b, 104c, 104d, 104e. FIG. 14 is a top view of the stacked covers of FIG. 13. FIG. 15 is a cross-sectional view of the stacked covers 104a, 104b, 104c, 104d. 104e, through line 15-15 of FIG. 14. FIG. 16 is an enlarged view of Section 16 of FIG. 15. The cross-sectional view of FIG. 17 is through opposing partial radial grooves 212. FIG. 18 is an enlarged view of Section 18 of FIG. 15. As shown in FIGS. 15 and 17, when stacked, the top surfaces of certain features of a lower cover, such as the cover 104a, are positioned adjacent the bottom surfaces of corresponding features of the cover stacked upon it, such as the cover 104b, with minimal air space there between. As shown in FIGS. 17 and 18, the sidewalls 216a, 216b, 216c, 216d, 216e of the adjacent stacked containers partially overlap so that the combined height of the stacked containers is much less than the combined heights of the individual covers.

Figure 19:
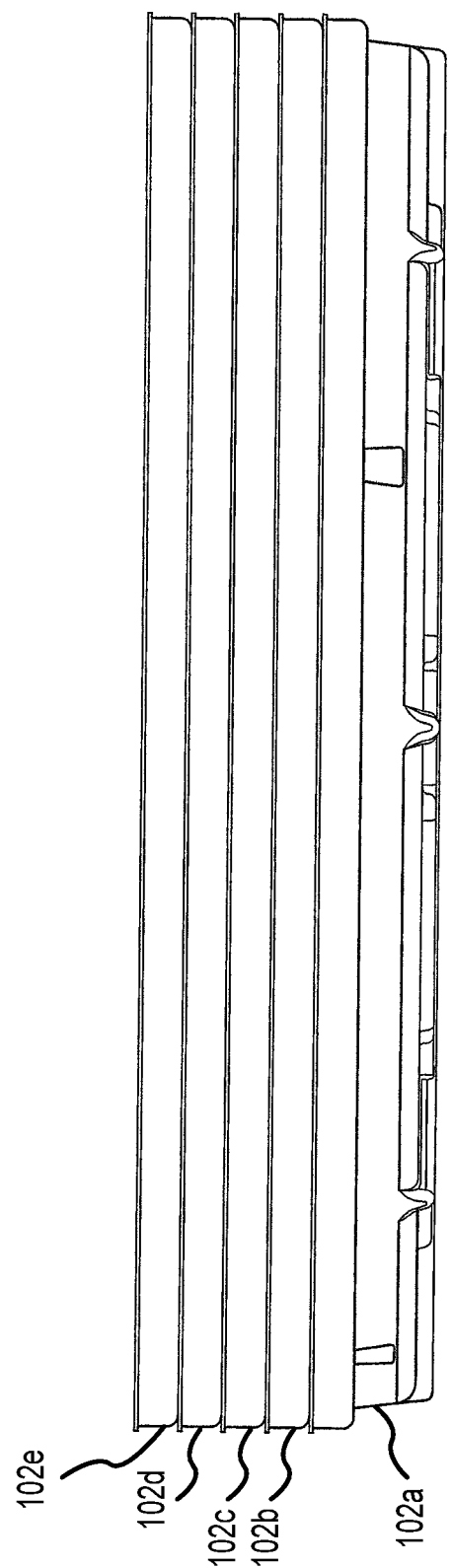
FIG. 19 depicts a plurality of bases in a stacked configuration.
Figure 20:
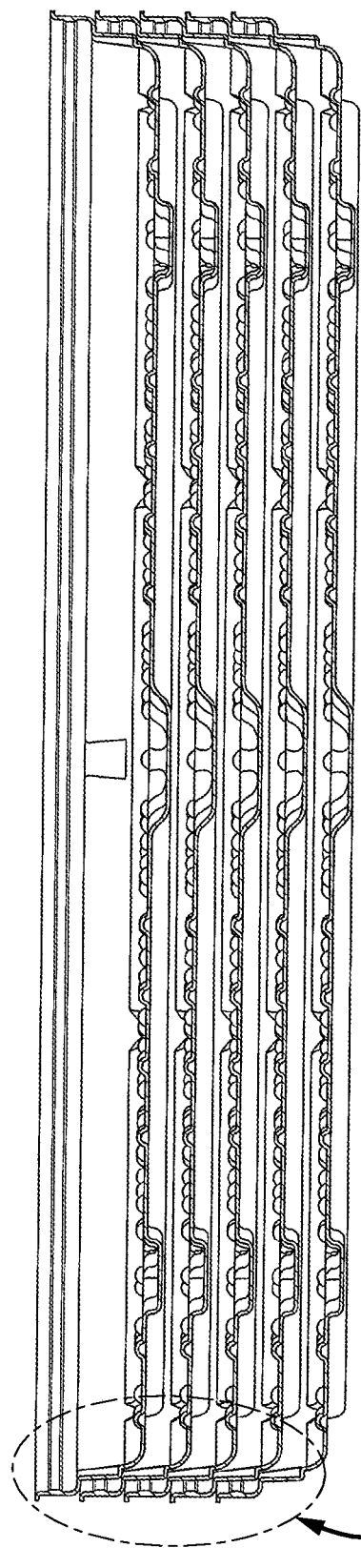
FIG. 20 is a section view of the plurality of stacked bases of FIG. 19.
Figure 21:
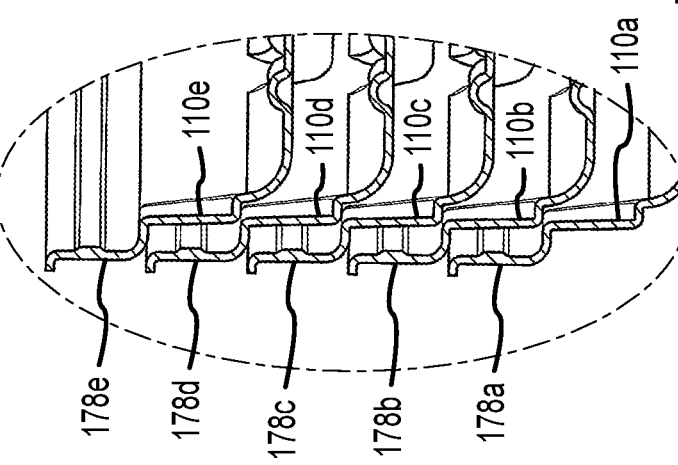
FIG. 21 is an enlarged section view of the plurality of stacked bases of FIG. 19.
Figure 22:
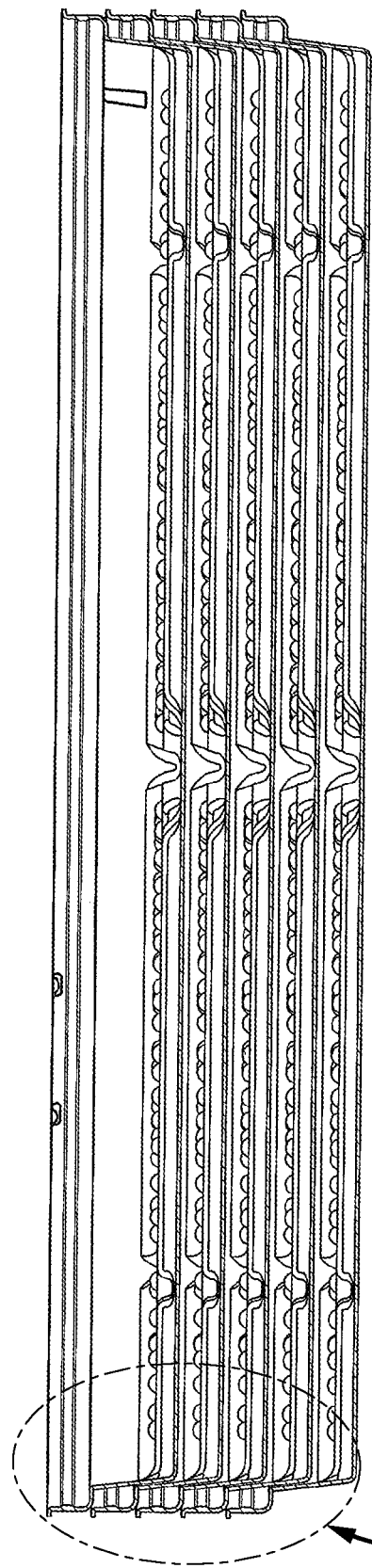
FIG. 22 is a section view of the plurality of stacked bases of FIG. 19.
Figure 23:
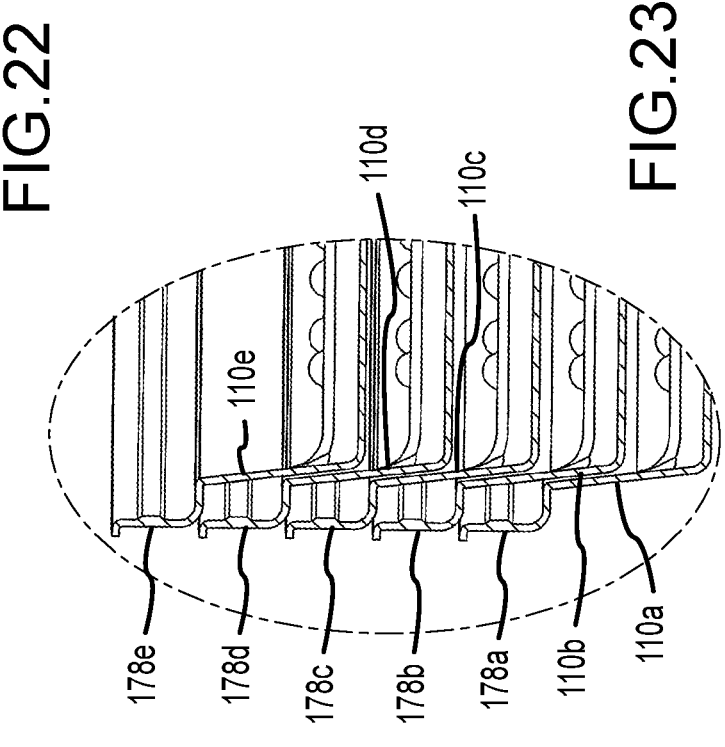
FIG. 23 is an enlarged section view of the plurality of stacked bases of FIG. 19.

FIG. 19 is a side view of a series of five (5) stacked bases 102a, 102b, 102c, 102d, 102e. FIG. 20 is a cross-section of the series of stacked bases of FIG. 19, through line 20-20 of FIG. 5 (which is a top view of a base 102, such as the base 102e of FIG. 19). The cross-section of FIG. 20 is through opposing denesting lugs 172. FIG. 21 is an enlarged view of Section 21 of FIG. 20. FIG. 22 is a cross-sectional view of FIG. 5, through line 22-22. The cross-sectional view of FIG. 22 is through opposing radial grooves 116. FIG. 23 is an enlarged view of Section 23-23 of FIG. 22. As shown in FIGS. 20 and 22, when stacked, the top surfaces of certain features of a lower base, such as the base 102a, are positioned adjacent to the bottom surfaces of corresponding features of the base stacked upon it, such as the base 102b, with minimal air space. As shown in FIGS. 21 and 23, the sidewalls on one base 104, such as the base 104a, partially overlaps the second sidewall of the base stacked upon it, such as the base 104b, so that the combined height of the stacked bases 102a, 102b, 102c, 102d, 102e is much less than the combined heights of the individual bases.

Further, unlike conventional pizza boxes formed from a cardboard blank which has to be folded, no pre-assembly is required. Thus, the base 102 and cover 104 need not be handled by a user until selected for use to perform its intended function, which significantly reduces the likelihood of contamination.

During use, a user may select a base 102 from a stack of nested bases, place a food item (cooked or uncooked) onto the food receiving portion 108 of the base, select a cover 104 from a stack of nested covers, and lower the cover onto the base as described above.

The features of the segments of the elevated portion 200 of the cover 104 provide significant strength to the cover that, among other things, allows for stacking multiple food containers 100 together. For example, the elevated portion 200 and the upwardly facing circumferential section 208 include several curved and cornered portions of the segments 208, the partial radial grooves 212 and the shoulders 214 that improve the rigidity of the cover 104, contributing to the strength of the cover 104.

Figure 24:
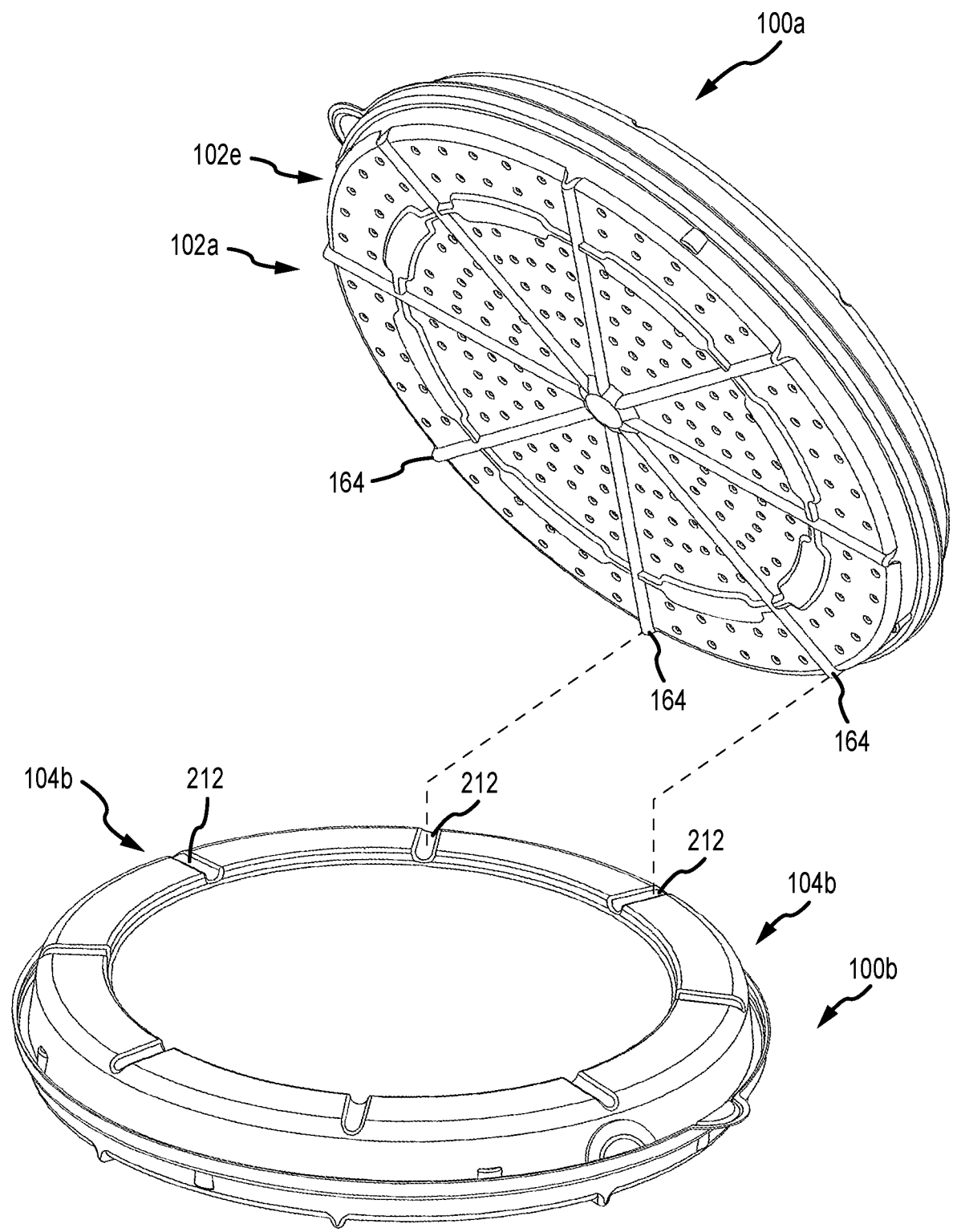
FIG. 24 depicts a method of stacking a plurality of food containers into a stacked configuration.

FIG. 24 shows how a food container 100a is stackable on a food container 100b, which is substantially the same or identical to the food container 100a. When the food container 100 is stacked on the food container 100b, the legs 164 of the base 102a are received in the partial radial grooves 212 of the food container 100b. As discussed above, the raised circumferential section 200 of the elevated portion 200 is structurally rigid and serves to distribute supporting forces of the legs 164 of the base 102a when the upper food container 102a stacked on the cover 104b of the lower food container 100b. In the illustrated implementation, the shape of the legs 164 complement the shape of the partial radial grooves 212 to maximize the contact surface area between the legs 164 and the grooves 212. Thus, the legs 164 also support the food container 100a on top of the cover 104b of the food container 100b. Moreover, when one food container 100a is stacked on the lower food container 100b and the weight bearing legs 164 are received in the partial radial grooves 212 the food container 100a and the food container 100b are restricted from lateral or rotational movement with respect to each other. This helps keep the food containers in a stacked relationship during transportation of the food containers.

Figure 25:
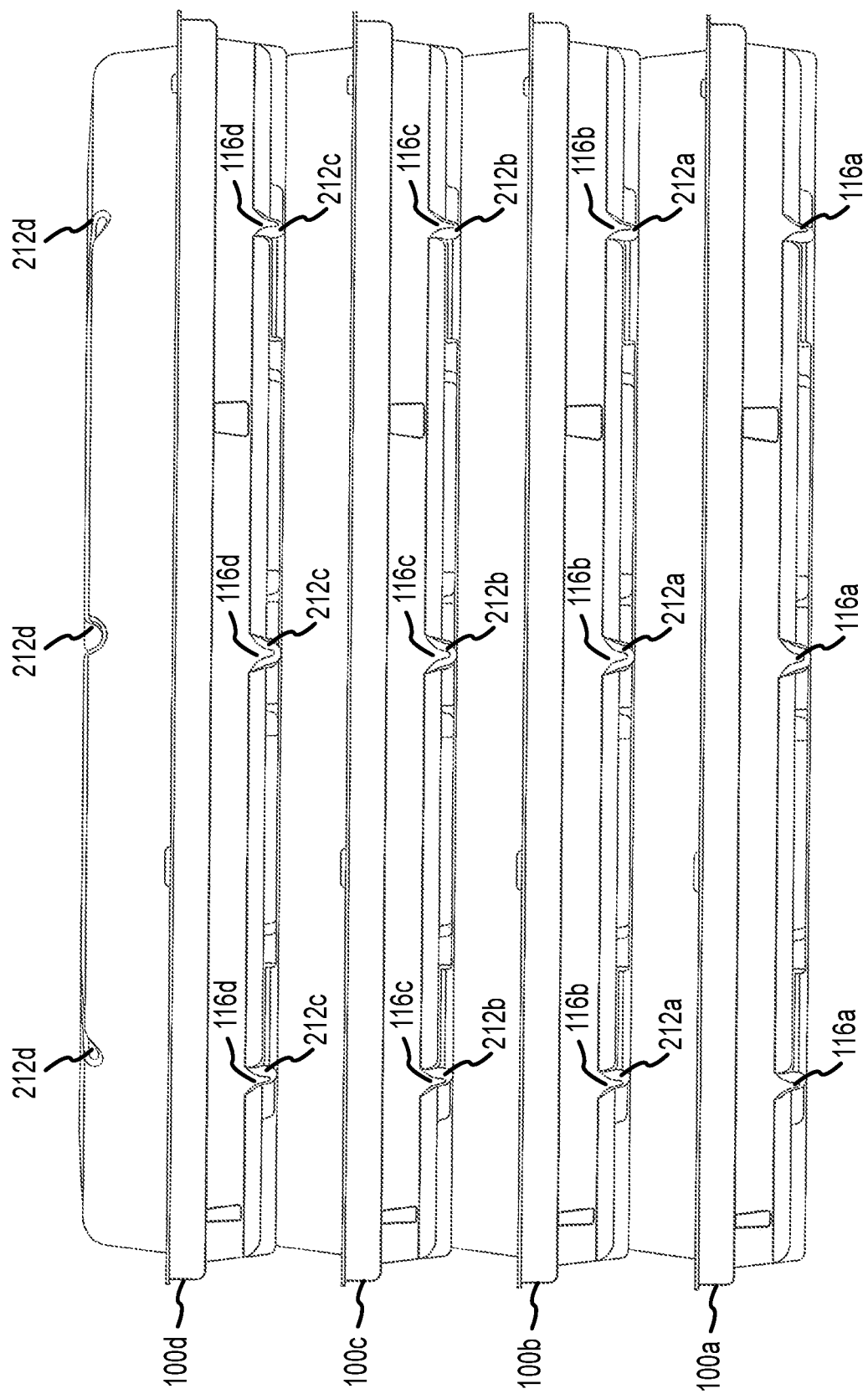
FIG. 25 is a side view of a plurality of food containers in a stacked configuration.
Figure 26:
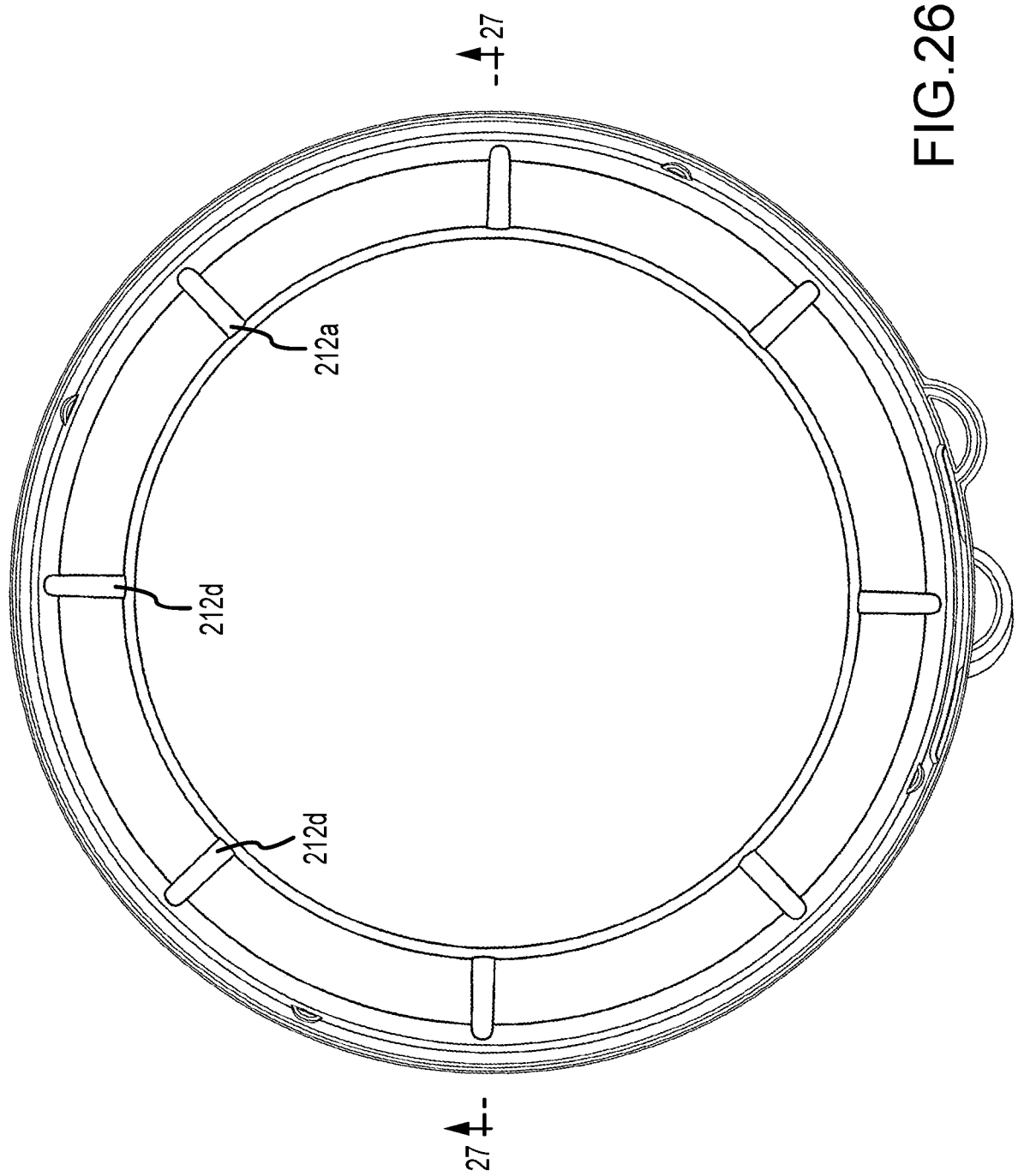
FIG. 26 is a top view of the plurality of stacked food containers of FIG. 25.
Figure 27:
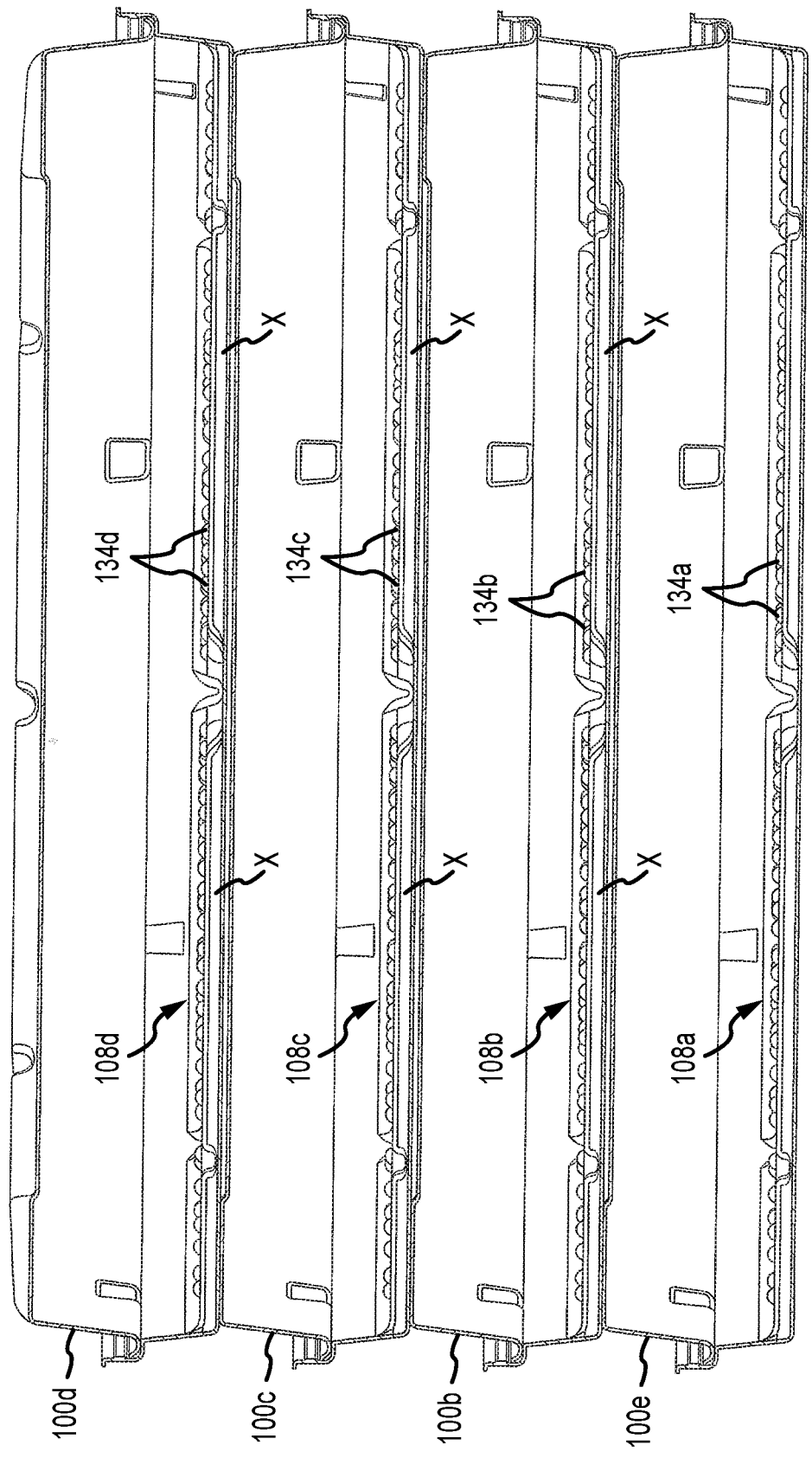
FIG. 27 is a section view of the plurality of stacked food containers of FIG. 25.

FIG. 25 is a side view of four (4) stacked food containers 100a, 100b, 100c, 100d. FIG. 26 is a top view of the top food container 100d of FIG. 25. FIG. 27 is a sectional view of the stacked containers stacked food containers 100a, 100b, 100c, 100d of FIG. 26, through line 26-26 of FIG. 26.

In FIG. 26, legs 164d are received in partial radial grooves 212c, legs 164c are received in partial radial groves 212b, and legs 164b are received in radial grooves 212a. In the sectional view of FIG. 27, the food containers 100a, 100b, 100c, 100d are in contact at the raised circumferential portions and not in contact in the spaces X between the bottoms 160b, 160c, 160d of the food containers 100b, 100c, 100d and the upwardly facing exterior surfaces 202d, of the food containers 100a, 100b, 100c.

As discussed above, the segments 210 of the covers 104 are provided on an upwardly facing circumferential section 208 that is raised above the upwardly facing exterior surface 202 of the cover 104. The surfaces 202a, 202b, 202c of the covers 104a, 104b, 104e are not, therefore, in contact with the bottom surfaces 160a, 160b, 160c of the bases 102b, 102c, 102d. This provides a substantial air space in the spaces between the stacked food containers 100a and 100b, 100b and 100c, and 100c and 100d, minimizing heat transfer between them.

Additionally, since portions of the food product in the food containers 100a, 100b, 100c, 100d are raised above the food-receiving portions 108a, 108b, 108c, 108d of the bases 102a, 102b, 102c, 102d by the protrusions 134, surfaces of the food containers adjacent the hot food products have decreased contact with each other when the food containers are stacked. This further decreases heat transfer between the food containers.

In at least some implementations, the exterior surface 202 and the interior surface 204 of the cover 104 are circular in shape, which facilitates printing (e.g., laser printing, embossing, debossing, pad printing) thereon with text and/or graphics (e.g., brand name, logo, image, instructions). Such printing may be provided with on other shapes, as well. For example, as shown in FIG. 1, a brand ABC 270 is shown on the surface 202 of the cover. As shown in FIG. 11, for example, discount information XYZ 272 is shown on the underside 204 of the cover 104.

The patents and patent publications discussed herein, and U.S. Provisional Patent Application No. 62/793,262, which was filed on Jan. 16, 2019 and is assigned to the assignee of the present application, is incorporated by reference herein.

Changes may be made to the implementations in light of the above-detailed description without departing from the spirit and scope of the invention.

We claim:
1. A food container comprising:
a base comprising:
 a food-receiving portion comprising a planar surface that is upwardly facing and has a perimeter; and
 a sidewall extending upwardly from the base, around the perimeter;
 a central well extending downwardly from the planar surface at a center of the planar surface;
 a plurality of protruding radial channels extending downwardly from the planar surface from the sidewall to the central well, the plurality of protruding radial channels form weight-bearing legs for supporting the base; and
a cover comprising:
 at least one wall sized and shaped to provide an interior chamber with the base when the cover is engaged with the base, closing the container;
 an upwardly facing exterior surface extending from at least one wall that is substantially planar and forms a top to the cover;
 the at least one wall having a periphery;
 a plurality of partial radial groves formed into the upwardly facing exterior surface, the plurality of partial radial groves accept the legs of base when stacking a first food container onto a second food container;
wherein the sidewall of the base defines a first engaging wall and the at least one wall of the cover define a second engaging wall,
the first engaging wall and the second engaging wall are configured to be selectively engaged to secure the cover to the base,
the first engaging wall comprises an inwardly extending protrusion and the second engaging wall comprises an upwardly facing curved portion and terminates at an outer end, and
the outer end is configured to engage with the inwardly extending protrusion to achieve a snap fit between the base and the cover.

2. The food container of claim 1, wherein:
the first engaging wall is an annular first engaging wall extending around the entirety of the base; and
the second engaging wall is an annular second engaging wall extending around the entirety of the cover.

3. The food container of claim 2, wherein, when the first engaging wall is engaged with the second engaging wall,
at least one of the annular first engaging wall and the annular second engaging wall bears against the other.

4. The food container of claim 1, wherein the first inwardly extending protrusion has a tapered upper side and a tapered lower side.

5. The food container of claim 1, wherein the first engaging wall is displaced from the sidewall of the cover by a connecting wall forming a ledge positioned to support upon a bottom of the upwardly curved portion when the cover is connected to the base, the first engaging wall and the ledge forming a receiving region to receive the upwardly facing curved portion.

6. The food container of claim 1, further comprising a first tab extending outward from a portion of the first engaging wall.

7. The food container of claim 6, further comprising a second tab extending outward from a portion of the second engaging wall.

8. The food container of claim 7, wherein the second tab is configured to fold upward when the cover is attached to the base.

9. The food container of claim 7, wherein the second tab is coupled to the second engaging wall via a hinge.

10. The food container of claim 9, wherein the hinge comprises a downwardly curved portion between the tab and the upwardly facing curved portion.

11. The food container of claim 9 wherein the second tab is coupled to an end of the upwardly facing curved portion.

12. The food container of claim 1, wherein:
the cover has an upwardly facing surface and a downwardly facing surface; and
text and/or graphics is provided on one or both of the upwardly facing surface and the downwardly facing surface by laser printing, embossing, debossing, and/or pad printing.

13. The food container of claim 1, wherein at least one of the cover and the base comprise compostable fiber, plastic, or Styrofoam.

14. A food container comprising:
a base comprising:
　a food-receiving portion comprising a planar surface that is upwardly facing and has a perimeter; and
　a sidewall extending upwardly from the base, around the perimeter;
　a central well extending downwardly in the planar surface at a center of the planar surface;
　a plurality of protruding radial channels extending downwardly from the planar surface from the sidewall to the central well, the plurality of protruding radial channels form weight-bearing legs for supporting the base;
　visual indicia positioned on the sidewall and adjacent to each of the plurality of protruding radial channels, the visual indicia to aid the user in cutting a food item along the plurality of protruding radial channels; and
a cover comprising:
　at least one wall sized and shaped to provide an interior chamber with the base when the cover is engaged with the base, closing the container;
　an upwardly facing exterior surface extending from at least one wall that is substantially planar and forms a top to the cover;
　the at least one wall having a periphery;
　a plurality of partial radial groves formed into the upwardly facing exterior surface, the plurality of partial radial groves accept the legs of base when stacking a first food container onto a second food container;
wherein the sidewall of the base defines a first engaging wall and the at least one wall of the cover define a second engaging wall,
the first engaging wall and the second engaging wall are configured to be selectively engaged to secure the cover to the base,
the first engaging wall comprises an inwardly extending protrusion and the second engaging wall comprises an upwardly facing curved portion and terminates at an outer end, and
the outer end is configured to engage with the inwardly extending protrusion to achieve a snap fit between the base and the cover.

15. A food container comprising:
a base comprising:
　a food-receiving portion comprising a planar surface that is upwardly facing and has a perimeter; and
　a sidewall extending upwardly from the base, around the perimeter;
　a central well extending downwardly in the planar surface at a center of the planar surface;
　a plurality of dome-shaped protrusions extending upwardly from the planar surface;
　a plurality of protruding radial channels extending downwardly from the planar surface from the sidewall to the central well, the plurality of protruding radial channels form weight-bearing legs for supporting the base;
　visual indicia positioned on the sidewall and adjacent to each of the plurality of protruding radial channels, the visual indicia to aid the user in cutting a food item along the plurality of protruding radial channels; and
a cover comprising:
　at least one wall sized and shaped to provide an interior chamber with the base when the cover is engaged with the base, closing the container;
　an upwardly facing exterior surface extending from at least one wall that is substantially planar and forms a top to the cover;
　the at least one wall having a periphery;
　a plurality of partial radial groves formed into the upwardly facing exterior surface, the plurality of partial radial groves accept the legs of base when stacking a first food container onto a second food container;
wherein the sidewall of the base defines a first engaging wall and the at least one wall of the cover define a second engaging wall,
the first engaging wall and the second engaging wall are configured to be selectively engaged to secure the cover to the base,
the first engaging wall comprises an inwardly extending protrusion and the second engaging wall comprises an upwardly facing curved portion and terminates at an outer end, and
the outer end is configured to engage with the inwardly extending protrusion to achieve a snap fit between the base and the cover.

* * * * *